(12) United States Patent
Kang et al.

(10) Patent No.: US 11,954,502 B2
(45) Date of Patent: Apr. 9, 2024

(54) ELECTRONIC APPARATUS AND THE CONTROL METHOD THEREOF

(71) Applicant: SAMSUNG ELECTRONICS CO., LTD., Suwon-si (KR)

(72) Inventors: Kyungmin Kang, Suwon-si (KR); Iksoon Kim, Suwon-si (KR); Yoojin Park, Suwon-si (KR); Surngkyo Oh, Suwon-si (KR); Bongwon Seo, Suwon-si (KR); Cheulhee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 562 days.

(21) Appl. No.: 17/262,517

(22) PCT Filed: Apr. 19, 2019

(86) PCT No.: PCT/KR2019/004729
§ 371 (c)(1),
(2) Date: Jan. 22, 2021

(87) PCT Pub. No.: WO2020/022610
PCT Pub. Date: Jan. 30, 2020

(65) Prior Publication Data
US 2021/0294614 A1    Sep. 23, 2021

(30) Foreign Application Priority Data

Jul. 25, 2018 (KR) .................. 10-2018-0086786

(51) Int. Cl.
*G06F 9/445* (2018.01)
*G06F 8/65* (2018.01)
*G06F 9/4401* (2018.01)

(52) U.S. Cl.
CPC ............ *G06F 9/44505* (2013.01); *G06F 8/65* (2013.01); *G06F 9/4406* (2013.01); *G06F 9/442* (2013.01)

(58) Field of Classification Search
CPC ........................................................ G06F 9/44
See application file for complete search history.

(56) References Cited

U.S. PATENT DOCUMENTS 6,754,895 B1 * 6/2004 Bartel ............... H04M 1/72406
  717/176
7,516,316 B2 * 4/2009 Chang ................... G11C 16/20
  713/1

(Continued)

FOREIGN PATENT DOCUMENTS

EP    1 596 290       11/2005
JP    2009-146404      7/2009

(Continued)

OTHER PUBLICATIONS

Extended European Search Report dated Jul. 16, 2021 in EP Application No. 19840902.1.

(Continued)

*Primary Examiner* — Phil K Nguyen
(74) *Attorney, Agent, or Firm* — Nixon & Vanderhye, P.C.

(57) ABSTRACT

Disclosed is an electronic apparatus, including: a storage; and a processor configured to execute a first execution code based on first configuration information in response to an execution event of a program including the first execution code and the first configuration information stored in the storage, update the program by replacing the first execution code and the first configuration information with a second execution code and second configuration information in response to an update event of the program, and update the first configuration information to the second configuration (Continued)

information while maintaining the first execution code in response to the update event of the first configuration information.

13 Claims, 23 Drawing Sheets

(56) References Cited

U.S. PATENT DOCUMENTS

| | | | |
|---|---|---|---|
| 9,940,123 B1* | 4/2018 | Ayoub | G06F 13/4295 |
| 10,489,582 B1* | 11/2019 | Raman | G06F 21/53 |
| 2003/0135350 A1* | 7/2003 | Cheston | G06F 21/572 |
| | | | 702/186 |
| 2005/0125649 A1* | 6/2005 | Lu | G06F 8/65 |
| | | | 713/1 |
| 2005/0257208 A1 | 11/2005 | Blumfield et al. | |
| 2007/0055970 A1* | 3/2007 | Sakuda | G06F 8/65 |
| | | | 717/168 |
| 2008/0270685 A1* | 10/2008 | Kato | G06F 8/65 |
| | | | 711/E12.001 |
| 2009/0138650 A1* | 5/2009 | Lin | G06F 8/65 |
| | | | 711/E12.008 |
| 2009/0217257 A1* | 8/2009 | Huang | G06F 8/65 |
| | | | 711/E12.001 |
| 2012/0291014 A1* | 11/2012 | Shrinivasan | G06F 11/3664 |
| | | | 717/124 |
| 2019/0286343 A1* | 9/2019 | Chuang | G06F 3/0658 |
| 2020/0167473 A1* | 5/2020 | Polyakov | G06F 21/54 |

FOREIGN PATENT DOCUMENTS

| | | |
|---|---|---|
| JP | 2016-081163 | 5/2016 |
| KR | 10-2006-0045811 | 5/2006 |
| KR | 10-2007-0046500 | 5/2007 |
| KR | 10-2008-0078112 | 8/2008 |
| KR | 10-1073170 | 10/2011 |
| KR | 10-2012-0041351 | 5/2012 |
| KR | 10-2014-0017906 | 2/2014 |
| KR | 10-1672454 | 11/2016 |
| KR | 10-2017-0037691 | 4/2017 |
| WO | 2014/066349 | 5/2014 |

OTHER PUBLICATIONS

Office Action dated Jan. 30, 2023 in Korean Application No. 10-2018-0086786 and English-language machine translation.
Date, Pertinent pages, etc.) International Search Report for PCT/KR2019/004729 dated Aug. 5, 2019, 3 pages.
Written Opinion of the ISA for PCT/KR2019/004729 dated Aug. 5, 2019, 5 pages.

* cited by examiner

ELECTRONIC APPARATUS AND THE CONTROL METHOD THEREOF

This application is the U.S. national phase of International Application No. PCT/KR2019/004729 filed Apr. 19, 2019 which designated the U.S. and claims priority to KR Patent Application No. 10-2018-0086786 filed Jul. 25, 2018, the entire contents of each of which are hereby incorporated by reference.

BACKGROUND

1. Field

The disclosure relates to an electronic apparatus and a control method thereof, and more particularly, to an electronic apparatus capable of efficiently upgrading software and a control method thereof.

2. Discussion of Related Art

In some cases, software updates are required during the use of electronic apparatus.

When the software for the electronic apparatus is updated, the use of the electronic apparatus is temporarily stopped. If an error occurs during the software update, since a problem may occur in an operation of a display apparatus itself, in most cases, the use of the electronic apparatus is stopped during the software update.

Meanwhile, in the conventional case, the entire firmware needs to be updated when the software is updated. As a result, it took a lot of time to update the software. The use of the electronic apparatus has been stopped for as long as that time.

SUMMARY

The disclosure is to provide an electronic apparatus capable of quickly and efficiently performing software update.

According to an embodiment of the disclosure, an electronic apparatus includes: a storage; and a processor configured to execute a first execution code based on first configuration information in response to an execution event of a program including the first execution code and the first configuration information stored in the storage, update the program by replacing the first execution code and the first configuration information with a second execution code and second configuration information in response to an update event of the program, and update the first configuration information to the second configuration information while maintaining the first execution code in response to the update event of the first configuration information.

The processor may output information on the update of the program to a user during the update of the program, and perform the update of the first configuration information without outputting the information on the update of the first configuration information when updating the first configuration information.

The processor may determine whether to perform the update of the first configuration information in response to power off of the electronic apparatus during the execution of the program. If it is determined that the update of the first configuration information is performed, a display of the electronic apparatus may be turned off, and the update of the first configuration information may be performed.

The processor may update the first configuration information based on the determination that the program is not being executed.

The processor may release a reference to the first configuration information of the program being executed, and update the first configuration information.

The processor may stop the execution of the program being executed and update the first configuration information.

The electronic apparatus may further include a memory into which data to be accessed by the processor is loaded, in which the processor may receive the second configuration information from a server, store the received second configuration information in the storage, turn off the memory in response to the power off, and update the first configuration information using the second configuration information stored in the storage, when it is determined that the update of the first configuration information needs to be performed.

The electronic apparatus may further include a display, in which the processor may start booting of the display with the display being turned off after the turn off of the memory, and update the first configuration information using the second configuration information stored in the storage during the booting.

The processor may store the data loaded into the memory in the storage and then turn off the memory when it is determined that the update of the first configuration information needs to be performed in response to the power off, and load the data stored in the storage into the memory when the update of the first configuration information is completed. When it is determined that it is not necessary to update the first configuration information in response to the power off, the processor and the display may be turned off while power is continuously applied to the memory.

The processor may stop the update and perform an operation according to a user command when the user command is input through a user input interface while the first configuration information is updated to the second configuration information. That is, the display of the electronic apparatus is powered on, and the first execution code is executed based on the first configuration information.

According to another embodiment of the disclosure, a control method of an electronic apparatus includes: storing a program including a first execution code and first configuration information in a storage; executing the first execution code based on the first configuration information in response to an execution event of the program; updating the program by replacing the first execution code and the first configuration information with a second execution code and second configuration information in response to an update event of the program; and updating the first configuration information to second configuration information while maintaining the first execution code in response to an update event of the first configuration information.

The updating of the program may further include outputting information on the update of the program to a user during the update of the program, and in the updating of the first configuration information, the update of the first configuration information may be performed without outputting the information on the update of the first configuration information.

In the updating of the first configuration information, it may be determined whether or not to update the first configuration information in response to power off of the electronic apparatus during the execution of the program. If it is determined that the update of the first configuration information is performed, a display of the electronic apparatus may be turned off, and the update of the first configuration information may be performed.

In the updating of the first configuration information, the first configuration information may be updated based on the determination that the program is not being executed.

In the updating of the first configuration information, a reference to the first configuration information of the program being executed may be released, and the first configuration information may be updated.

In the updating of the first configuration information, the execution of the program being executed may be stopped, and the first configuration information may be updated.

The electronic apparatus may further include a memory into which data to be accessed by the processor of the electronic apparatus is loaded, and in the updating of the first configuration information, when it is determined that the update of the first configuration information needs to be performed, the second configuration information may be received from the server and stored in the storage, and then the memory may be turned off in response to the power off, and the first configuration information may be updated using the second configuration information stored in the storage.

The electronic apparatus may further include a display, and in the updating of the first configuration information, the display may start booting with being turned off after the turn off of the memory and the first configuration information may be updated using the second configuration information stored in the storage during the booting.

In the updating of the first configuration information, the data loaded into the memory may be stored in the storage and then the memory may be turned off when it is determined that the update of the first configuration information needs to be performed in response to the power off, and the data stored in the storage may be loaded into the memory when the update of the first configuration information is completed. When it is determined that it is not necessary to update the first configuration information in response to the power off, the processor and the display may be turned off while power is continuously applied to the memory.

According to still another embodiment of the disclosure, a computer program is a computer program stored in a medium to execute the control method by being combined with the electronic apparatus.

The computer program may be stored in the medium in the server and may be downloaded to the electronic apparatus through a network.

As described above, according to the disclosure, it is possible to quickly and efficiently update the software of the electronic apparatus.

DETAILED DESCRIPTION

Figure 1:
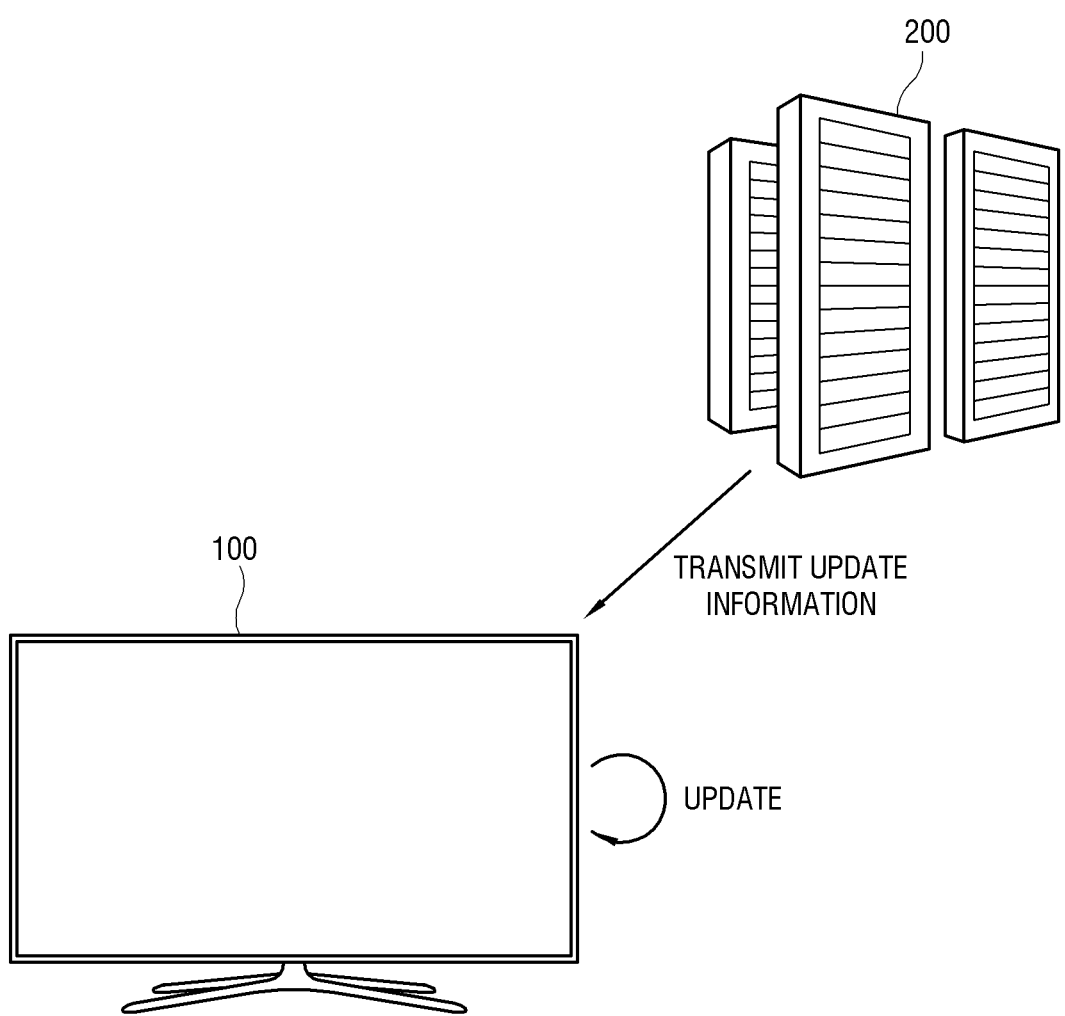
FIG. 1 is a schematic diagram of a system including an electronic apparatus according to an embodiment of the disclosure.

Hereinafter, embodiments of the disclosure will be described in detail with reference to the accompanying drawings. In the drawings, the same reference numbers or signs refer to components that perform substantially the same function, and the size of each component in the drawings may be exaggerated for clarity and convenience. However, the technical idea and the core configuration and operation of the disclosure are not limited only to the configuration or operation described in the following examples. In describing the disclosure, if it is determined that a detailed description of the known technology or configuration related to the disclosure may unnecessarily obscure the subject matter of the disclosure, the detailed description thereof will be omitted.

In embodiments of the disclosure, terms including ordinal numbers such as first and second are used only for the purpose of distinguishing one component from other components, and singular expressions include plural expressions unless the context clearly indicates otherwise. Also, in embodiments of the disclosure, it should be understood that terms such as 'configured', 'include', and 'have' do not preclude the existence or addition possibility of one or more other features or numbers, steps, operations, components, parts, or combinations thereof. In addition, in the embodiment of the disclosure, a 'module' or a 'unit' performs at least one function or operation, and may be implemented in hardware or software, or a combination of hardware and software, and may be integrated into at least one module and implemented as at least one processor. In addition, in embodiments of the disclosure, at least one of the plurality of elements refers to not only all of the plurality of elements, but also each one or all combinations thereof excluding the rest of the plurality of elements. An expression "configured (or set) to" used in the disclosure may be replaced by an expression "suitable for", "having the capacity to" "designed to", "adapted to", "made to", or "capable of" depending on a situation. A term "configured (or set) to" may not necessarily mean "specifically designed to" in hardware. Instead, in some cases, an expression "a device configured to" may mean that the apparatus may "do" together with other apparatuses or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

FIG. 1 illustrates an electronic apparatus according to an embodiment of the disclosure. The electronic apparatus 100 according to the embodiment of the disclosure may be implemented as, for example, a set top box. In addition, the electronic apparatus 100 according to another embodiment of the disclosure may be a display apparatus 100. The display apparatus 100 may be implemented as, for example, displays such as a TV, an electronic frame, a digital billboard, a large format display (LFD), and a digital signage, wearable devices such as a smartphone, a tablet, a mobile phone, a smart watch, and a head-mounted display, and devices such as a computer and a multimedia player capable of outputting images of content. However, the electronic apparatus 100 according to the embodiment of the disclosure is not limited thereto, and may be implemented as any apparatus driven by software. However, in the following drawings, for convenience of explanation, a case in which the electronic apparatus 100 of the disclosure is implemented as a TV will be described as an example.

The electronic apparatus 100 according to the embodiment of the disclosure may receive update information from a server 200 and then perform an update based thereon. However, a method of providing, by the electronic apparatus 100 of the disclosure, update information is not limited thereto. For example, the electronic apparatus 100 of the disclosure may receive update information from external equipment, an external device, an external storage device, or the like other than the server 200.

Figure 2:
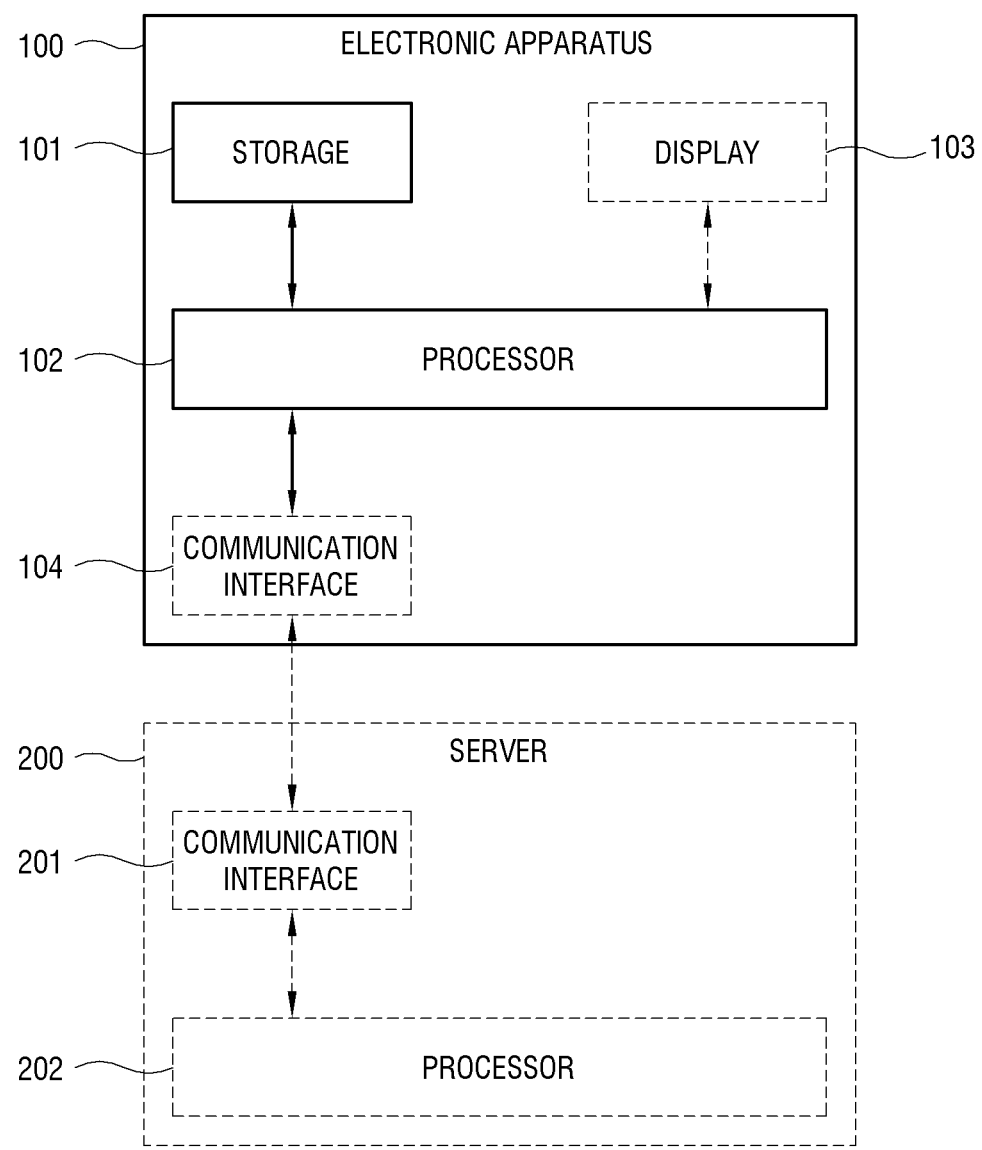
FIG. 2 is a block diagram illustrating a configuration of the electronic apparatus according to the embodiment of the disclosure.

FIG. 2 is a block diagram illustrating a configuration of the electronic apparatus according to the embodiment of the disclosure. The electronic apparatus 100 according to the embodiment of the disclosure includes a storage 101 and a processor 102. However, the configuration of the electronic apparatus 100 illustrated in FIG. 2 is only an example, and the electronic apparatus according to the embodiment of the disclosure may be implemented in another configuration. That is, the electronic apparatus according to the embodiment of the disclosure may be implemented by adding other components in addition to the components illustrated in FIG. 2 or by excluding a part of the components illustrated in FIG. 2. Each component in the embodiment of the disclosure may be implemented as at least one hardware and/or software, and may be implemented as a circuit or a chip.

The storage 101 may store a program including an execution code and configuration information. A detailed description of the execution code and the configuration information will be described later.

The storage 101 may be accessed by the processor 102 to perform reading, recording, modifying, deleting, updating, and the like of data. The storage 101 may include non-volatile memories such as a flash-memory, a hard-disc drive, and a solid-state drive (SSD) so that data can be stored regardless of whether or not system power is provided to the electronic apparatus 100. In addition, the storage 101 may include volatile memories such as a buffer and a RAM for temporarily loading data processed by the processor 102.

The processor 102 may perform reading, recording, modifying, deleting, updating, and the like of data in the storage 101. The processor 102 may be implemented as one or more hardware and/or software modules or a combination thereof to perform the above-mentioned processing.

The processor 102 may perform control to operate the overall components of the electronic apparatus 100. The processor 102 may include control programs (or instructions) for performing the control operation, a nonvolatile memory in which control programs are installed, a volatile memory in which at least a part of the installed control programs is loaded, and at least one process or a central processing unit (CPU) in which the loaded control programs are executed. In addition, such a control program may also be stored in electronic devices other than the electronic apparatus 100.

The control program may include a program(s) implemented in at least one of a BIOS, a device driver, an operating system, firmware, a platform, and an application program (application). As one embodiment, the application program may be pre-installed or stored in the electronic apparatus 100 at the time of manufacturing of the electronic apparatus 100, or installed in the electronic apparatus 100 based on data of the application program received from the outside when used later. The data of the application program may be downloaded from the external server, such as an application market, to the electronic apparatus 100, but is not limited thereto. Meanwhile, the processor 102 may be implemented in the form of a device, a S/W module, a circuit, and a chip, or a combination thereof.

The processor 102 may control the storage 101 to receive data, for example. The electronic apparatus 100 illustrated in FIG. 2 is implemented as a configuration that performs processing and control together in one processor 102, which is only an example, and the electronic apparatus 100 according to another embodiment of the disclosure may be implemented in a configuration further including a controller separately from the processor.

The electronic apparatus 100 according to the embodiment of the disclosure includes a display 103 and a communication interface 104.

The display 103 may display an image. The implementation scheme of the display 103 is not limited, and the display 103 may be implemented in various display schemes such as liquid crystal, plasma, light-emitting diode, an organic light-emitting diode, surface-electron gun conduction electron-emitter, carbon nano-tube, and nano-crystal. In the case of the liquid crystal scheme, the display 103 includes a liquid crystal display panel, a backlight unit that supplies light to the liquid crystal display panel, a panel driver that drives the liquid crystal display panel, and the like. The display 103 may be implemented as an OLED panel that is a self-luminous element without a backlight unit.

The communication interface 104 may communicate with an external module or an external device, for example, the server 200 and the like. The communication interface 104 may communicate in a wired or wireless manner. Therefore, communications can be implemented in various other communication schemes in addition to connection units including a connector or a terminal for wired connection. For example, the communication interface 104 may be configured to perform one or more communications of Wi-Fi, WiFi direct, Ethernet, Bluetooth, Bluetooth low energy (BLE), serial port profile (SPP), Zigbee, infrared communication, radio control, ultra-wide band (UWM), wireless USB, and near field communication (NFC). The communication interface may be implemented in the form of a device, a S/W module, a circuit, a chip, and the like.

The server 200 capable of communicating with the electronic apparatus 100 according to the embodiment of the disclosure may include a communication interface 201 and a processor 202. For the communication interface 201 and the processor 202 of the server 200, the description of the communication interface 104 and the processor 102 of the electronic apparatus 100 described above is applicable, and therefore a detailed description thereof will be omitted.

Figure 3:
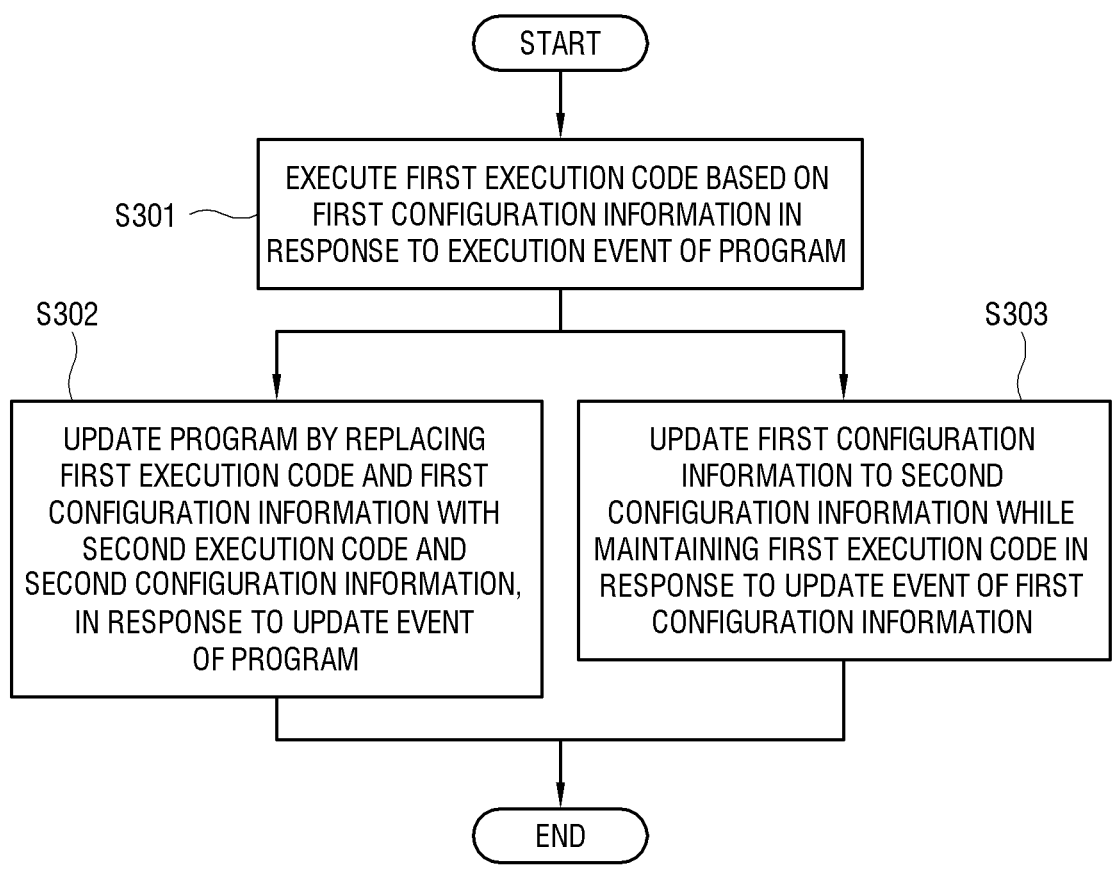
FIG. 3 is a flowchart illustrating an operation of the electronic apparatus according to the embodiment of the disclosure.

FIG. 3 is a flowchart illustrating an operation of the electronic apparatus according to the embodiment of the disclosure.

The storage 101 of the electronic apparatus 100 according to the embodiment of the disclosure may store a program. Here, the program means software that is driven by the electronic apparatus 100. The program may include an execution code and configuration information. The execution code means instructions, machine languages, and the like that may be understood by the electronic apparatus 100. The execution code includes not only the instructions or the machine languages that may be understood by the electronic apparatus 100 itself, but also instructions or machine languages that are translated by a compiler, assembler, interpreter, or the like and may be understood by the electronic apparatus 100. The configuration information includes various types of data, materials, information, and the like that are read or used by the execution code during the driving process of the program. The configuration information may be text-based information, but the format is not limited thereto. In addition, the configuration information includes information in which setting values for various functions of the electronic apparatus 100 are stored. For example, the configuration information includes various pieces of information set at the time of factory shipment of the electronic apparatus 100, specifically, a process scheduling priority, a display time of a logo during booting, and a setting value regarding whether to use a specific function, and the like.

The processor 102 of the electronic apparatus 100 according to the embodiment of the disclosure executes a first execution code based on first configuration information in response to an execution event of a program (S301). Here, the execution event of the program includes various situations, conditions, events, and the like that cause the program to be executed or operated in the electronic apparatus 100, and is not particularly limited in its form, contents, or the like. For example, the execution event of the program may be reception of a user input that instructs the execution of the program.

Figure 4:
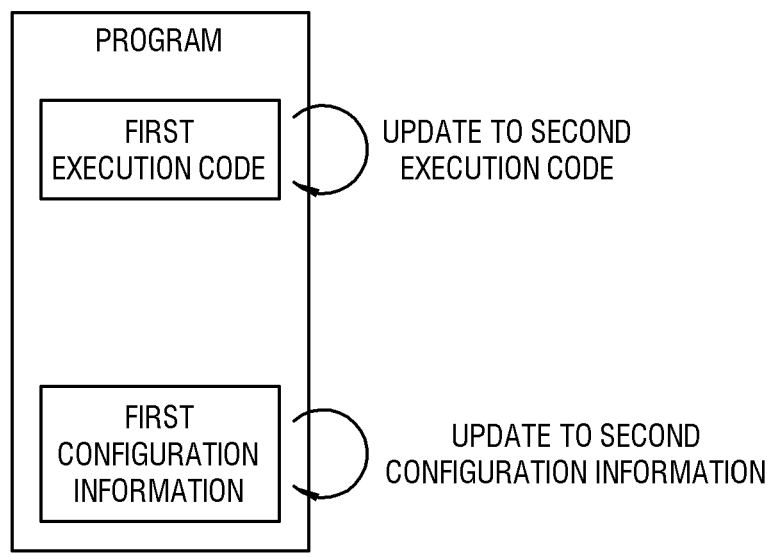
FIG. 4 is a diagram illustrating a method of updating a program according to an embodiment of the disclosure.
Figure 5:
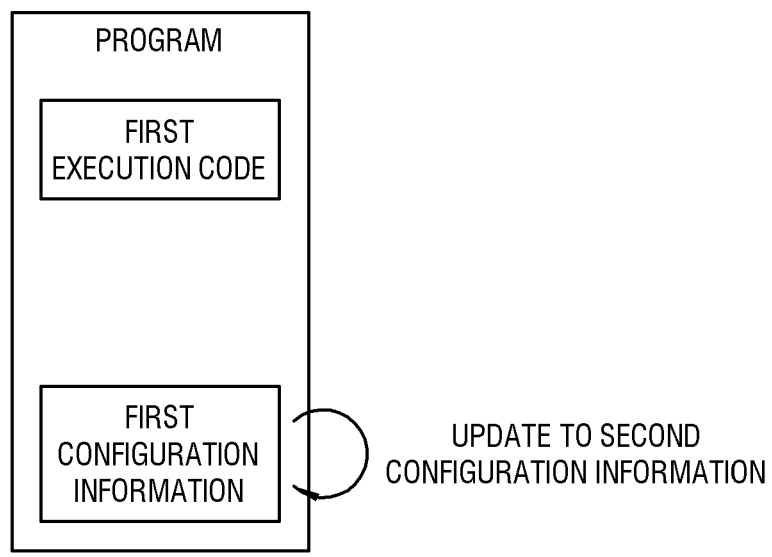
FIG. 5 is a diagram illustrating a method of updating configuration information according to an embodiment of the disclosure.

The processor 102 of the electronic apparatus 100 according to the embodiment of the disclosure updates a program by replacing the first execution code and the first configuration information with a second execution code and second configuration information in response to an update event of a program (S302). Alternatively, the processor 102 of the electronic apparatus 100 according to the embodiment of the disclosure updates the first configuration information to the second configuration information while maintaining the first execution code in response to the update event of the first configuration information (S303). This will be described with reference to FIGS. 4 and 5. When the current program includes the first execution code and the first configuration information, and when the program is updated, the first execution code is updated to the second execution code as illustrated in FIG. 4, and the first configuration information is updated to the second configuration information, thereby updating both the execution code and the configuration information. On the other hand, in the case of updating the configuration information, as illustrated in FIG. 5, only the configuration information is updated by updating the first configuration information to the second configuration information while keeping the first execution code unchanged.

Here, the update event of the program includes various situations, conditions, events, and the like that cause the program of the electronic apparatus 100 to be updated, and is not particularly limited in its form, contents, or the like. In addition, the update event of the configuration information includes various situations, conditions, events, and the like that cause the configuration information included in the program of the electronic apparatus 100 to be updated, and is not particularly limited in its form, contents, or the like as in the update event of the program. For example, the update event of the program may include receiving information from the server 200 informing the existence of the updated program. Likewise, the update event of the configuration information may include receiving the information from the server 200 informing the existence of the updated configuration information.

The operation of updating the program in response to the update event of the program and the operation of updating the configuration information in response to the update event of the configuration information may be selectively controlled and operated by one program or may be independently managed by different programs. For example, when the update event of the program and the update event of the configuration information include the information reception from the server 200, the second program may receive the information from the server 200 to determine whether the event is the update event of the program or the update event of the configuration information, thereby executing the update of the program or the update of the configuration information according to each event. Alternatively, a third program that monitors the occurrence of the update event of the program and a fourth program that monitors the occurrence of the update event of the configuration information exist separately. As a result, the third program may allow the update of the program to be executed when the update event of the program occurs, and the fourth program may allow the update of the configuration information to be executed when the update event of the configuration information occurs independently of the third program.

Various methods are available for distinguishing the update event of the program from the update event of the configuration information or identifying each event. For example, when the server 200 provides the information on the update to the electronic apparatus 100, it is possible to identify whether the update is an update related to a program or an update related to configuration information in or together with the provided information, and the electronic apparatus 100 may distinguish or identify each update event based on the identification information. For example, if the identification information is 1, the program may be identified to be updated, and if the identification information is 2, the configuration information may be identified to be updated. As another example, when each update information includes version information indicating each update, the type of update events may be distinguished based on the corresponding version information. For example, when updated version information is attached with 1.21, 1.22, 1.3, and the like, if a first decimal place of the updated version information is different from that of the current version information, the program may be identified to be updated, or if the updated version information and the current version information has the same first decimal place but have different decimal points from the second decimal place, the configuration information may be identified to be updated.

As a result, the execution code and the configuration information may be separated from the program, and when both the execution code and the configuration information need not to be updated and only the configuration information needs to be updated, the execution code is maintained and only the configuration information is updated, thereby more quickly and efficiently performing the update of the program depending on the situations.

Figure 6:
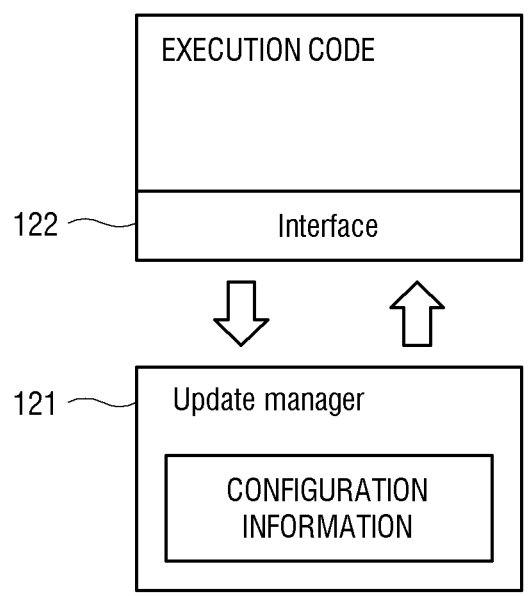
FIG. 6 is a diagram illustrating a detailed configuration of a processor according to an embodiment of the disclosure.

FIG. 6 illustrates a detailed configuration of a processor according to an embodiment of the disclosure. The processor 102 according to the embodiment of the disclosure may further include a configuration information update manager 121 and an interface 122. For example, when the electronic apparatus 100 continuously receives update information from the server 200, the configuration information update manager 121 communicates with the server 200 and monitors whether there is new update of configuration information. When it is checked that there is the new update of configuration information, the configuration information update manger 121 receives new configuration information, and the electronic apparatus 100 performs operations, such as selection, change, tracking, and management, on the configuration information to be changed. The interface 122 is responsible for control or communication between the execution code and the configuration information, and connects between the execution code and the configuration information.

An example of updating the configuration information of the electronic apparatus 100 by the processor 102 having such a detailed configuration will be described with reference to FIGS. 7 to 9.

Figure 7:
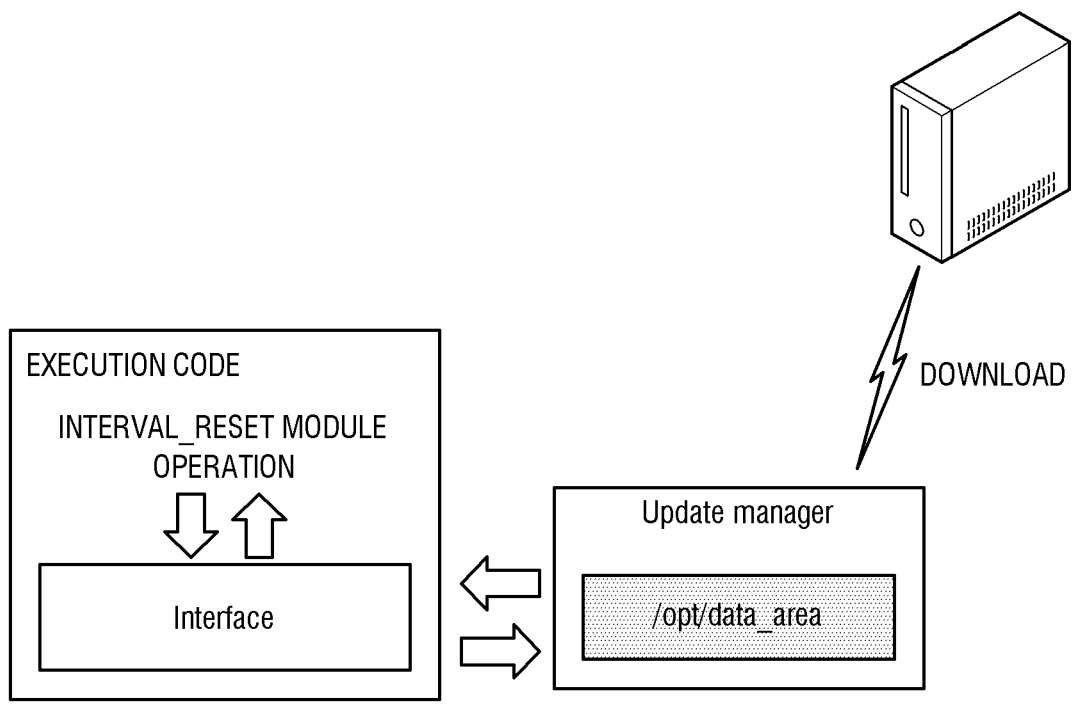
FIGS. 7, 8, and 9 are diagrams illustrating an application example of an update of the configuration information according to an embodiment of the disclosure.

FIG. 7 illustrates an application example of changing a setting value depending on a time interval between power on and power off of a TV when the electronic apparatus 100 is a smart TV and uses a function of allowing the TV to enter a standby mode immediately or a function of performing booting (hereinafter, referred to as 'cold reset') to initialize an operation of all components of the TV and then allowing the TV to enter the standby mode, when the TV is powered off. When the user inputs the power off, in order to make the TV operational faster at the next power on input, some smart TVs are designed to enter a standby mode which is a mode of maintaining the supply of power to some components (for example, memory), not stopping the operation of all the components of the TV. However, when the power off input instructing the entry into the standby mode and the power off input instructing the cold reset are not distinguished at the input device of the smart TV, the smart TV may be designed to determine and distinguish situations by itself. As an example, a user who is watching TV inputs the power off to the TV, inputs the power on again, and then checks a time interval for inputting the power off again, and thus, if the time interval is within a predetermined time, a program that determines as the power off input instructing the cold reset may be operated. In this case, in order to change a value for a predetermined time that is a criterion for the above determination, there is a need to change only the configuration information for the predetermined time by applying the disclosure. For example, when the configuration information for the predetermined time is stored in /opt/data_area, the configuration information update manager 121 of the processor 102 checks whether there are updates for /opt/data_area in the server 200, receives the configuration information downloaded from the server 200 when it is determined that there are updates for /opt/data_area, and changes the value of the /opt/data_area of the electronic apparatus 100 using the received configuration information. Thereafter, in determining whether to perform the power off and then perform the cold reset at the next power on according to the time interval between the power on and the power off of the TV, the interface 122 refers to newly changed and updated /opt/data_area. That is, only the configuration information is updated while the execution code of the program related to the above operation is maintained.

As another example of updating the configuration information of the electronic apparatus 100, a time interval for displaying a booting logo when the electronic apparatus 100 is started may be changed. This will be described with reference to FIG. 8.

For example, when the electronic apparatus 100 is a TV, a transient phenomenon may occur depending on the characteristics of the panel after power is applied to the display panel. In this case, by changing the time to display the booting logo when the TV is started, noise due to the occurrence of the transient phenomenon may be prevented from being visible to a user.

Figure 8:
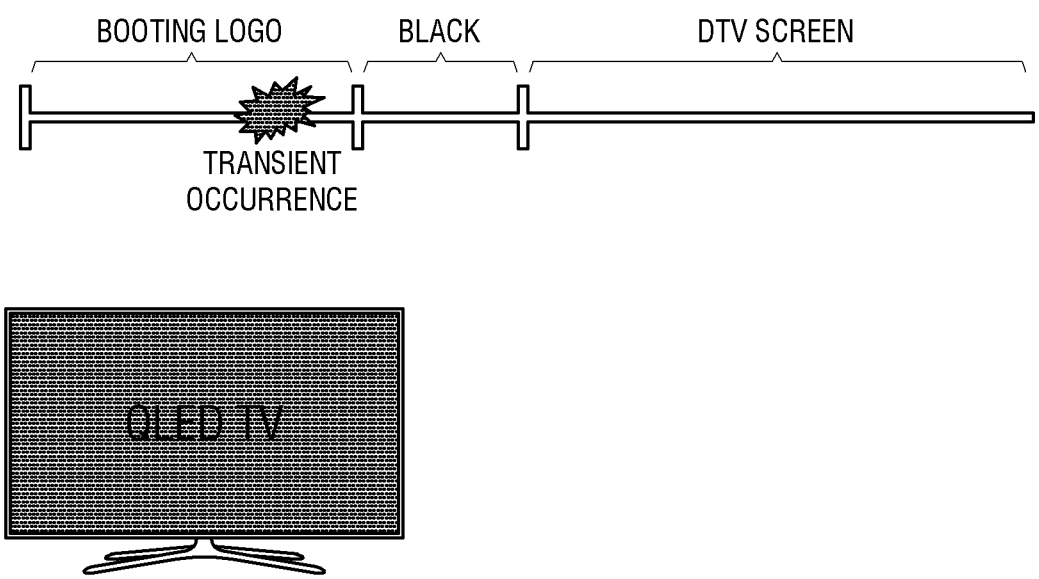
Figure 9:
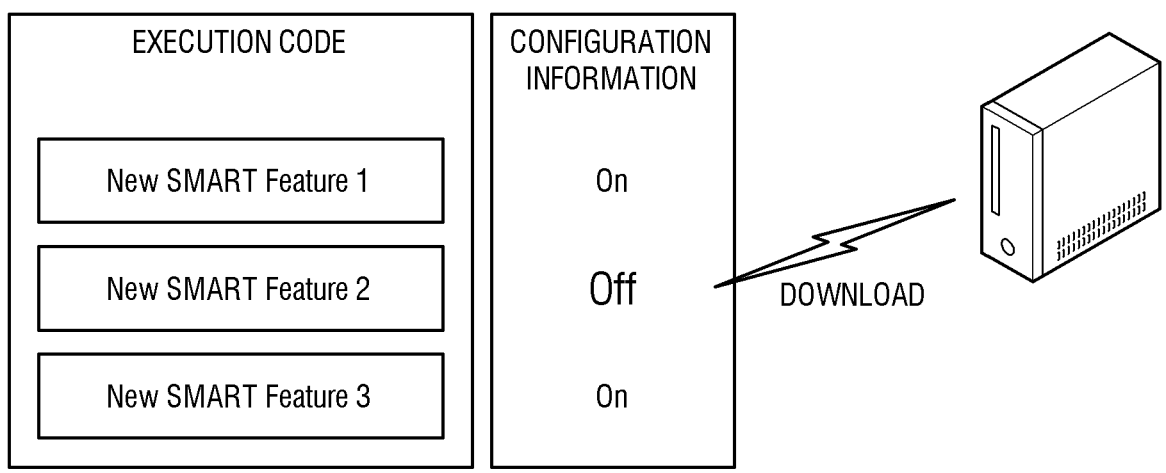

Specifically, as illustrated in FIG. 8, by changing /opt/logotime, which is configuration information on the time to display the booting logo, to configuration information having a larger value than before, the booting logo may continue to be displayed even during the time when the transient occurs. For example, when the change in the time to display the booting logo is started by the notification of the server 200, the configuration information update manager 121 of the processor 102 checks whether there are any updates for the /opt/logotime in the server 200 depending on the detection that the notification from the server 200 is received, and receives the configuration information downloaded from the server 200 and changes the value of /opt/logotime using the received configuration information when it is determined that there are any updates. Thereafter, the interface 122 refers to the newly changed /opt/data_area as the configuration information on the time to display the booting logo. That is, only the configuration information is updated while the execution code of the program related to the operation of displaying the booting logo is maintained.

As another example of updating the configuration information of the electronic apparatus 100, the configuration may be changed so that a specific function of the electronic apparatus 100 is enabled or disabled. This will be described with reference to FIG. 9.

For example, when the configuration information on whether to enable each function is allocated to each function 1, function 2, and function 3 of the electronic apparatus 100, the processor 102 updates the specific configuration information to provide a corresponding function, thereby enabling or disabling the corresponding function. For example, when the electronic apparatus 100 is released, function 1, function 2, and function 3 are all configured to be enabled, but when a problem has occurred in the function 2 and it is necessary to disable the function 2, the processor 102 receives the new configuration information (configuration information for disabling the function 2) on the function 2 from the server 200 and replaces the existing configuration information with the received configuration information, thereby disabling the function 2 thereafter.

On the other hand, the processor 102 of the electronic apparatus 100 according to the embodiment of the disclosure outputs information on the update of the program to the user during the update of the 'program', whereas the processor 102 may perform the update of the configuration information without outputting the information on the update of the configuration information at the time of the update of the 'configuration information'. As a method of outputting information to a user, an example of using a method of displaying a related image on a display 103 will be described with reference to FIGS. 10 and 11. However, the method of outputting information in the present embodiment is not limited thereto. As another example, the electronic apparatus 100 may output sound as well as video or may output vibrations.

Figure 10:
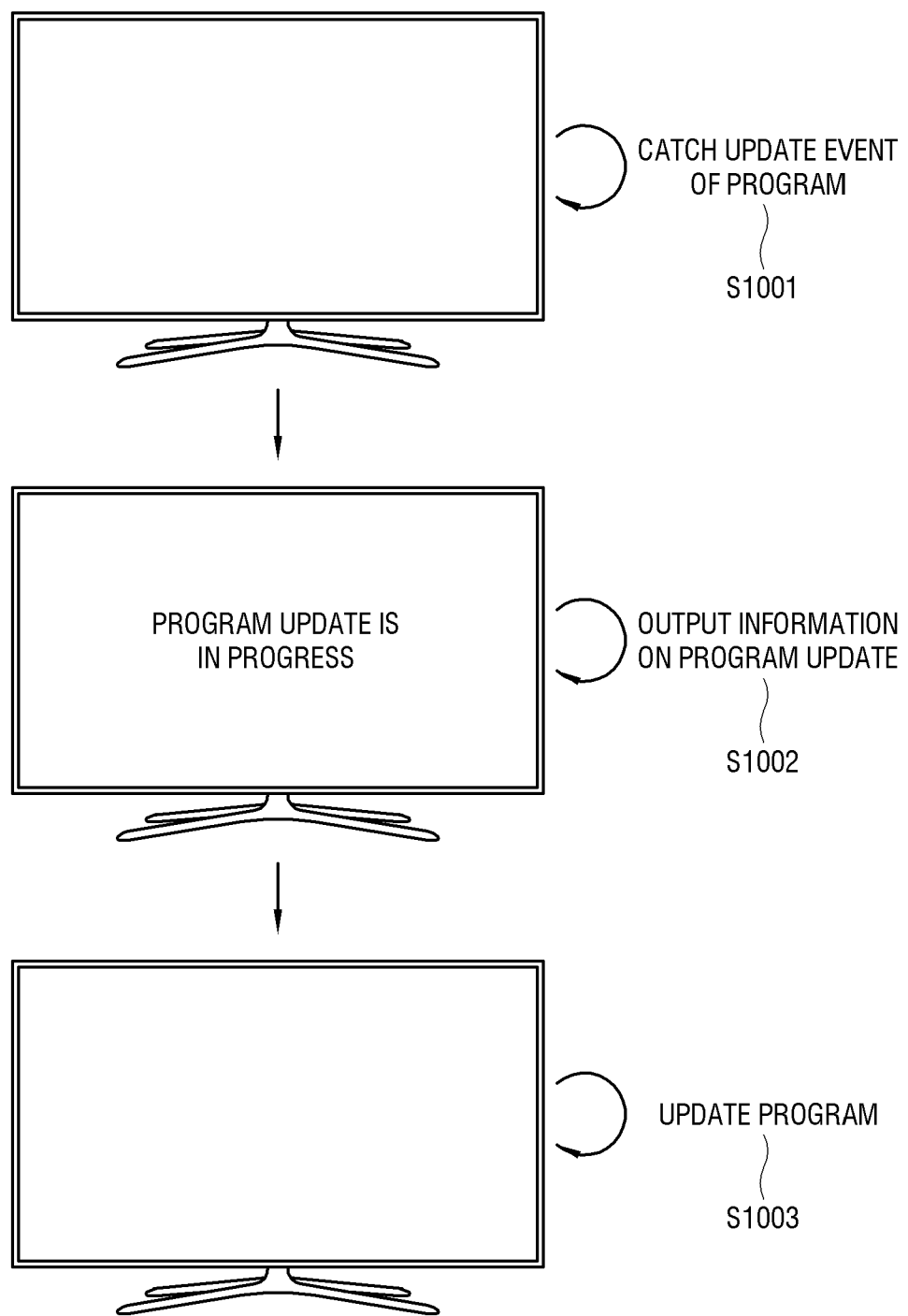
FIG. 10 is a diagram illustrating an example of an update of a program according to an embodiment of the disclosure.

FIG. 10 illustrates an example of the update of the program process when the electronic apparatus 100 includes the display 103.

The processor 102 of the electronic apparatus 100 according to the embodiment of the disclosure catches the update event of the program (S1001). As the update event of the program is caught, in the process of executing the update of the program or before performing the update, the processor 102 displays, for example, "the update of the program is in progress" on the display 103, as illustrated in FIG. 10 to output the information on the update of the program to the user (S1002) and perform the update of the program (S1003). In this way, the user may know that the update of the program is currently being executed, and accordingly, the user may recognize that power needs to be stably supplied to the electronic apparatus 100 and other operations are stopped, while the program is being updated. In addition to outputting the information on the update of the program to the display 103 by the processor 102, when the electronic apparatus 100 includes a user input unit, in order to prevent a command from being input from the user during the update of the program, the user input interface may not be operated.

Figure 11:
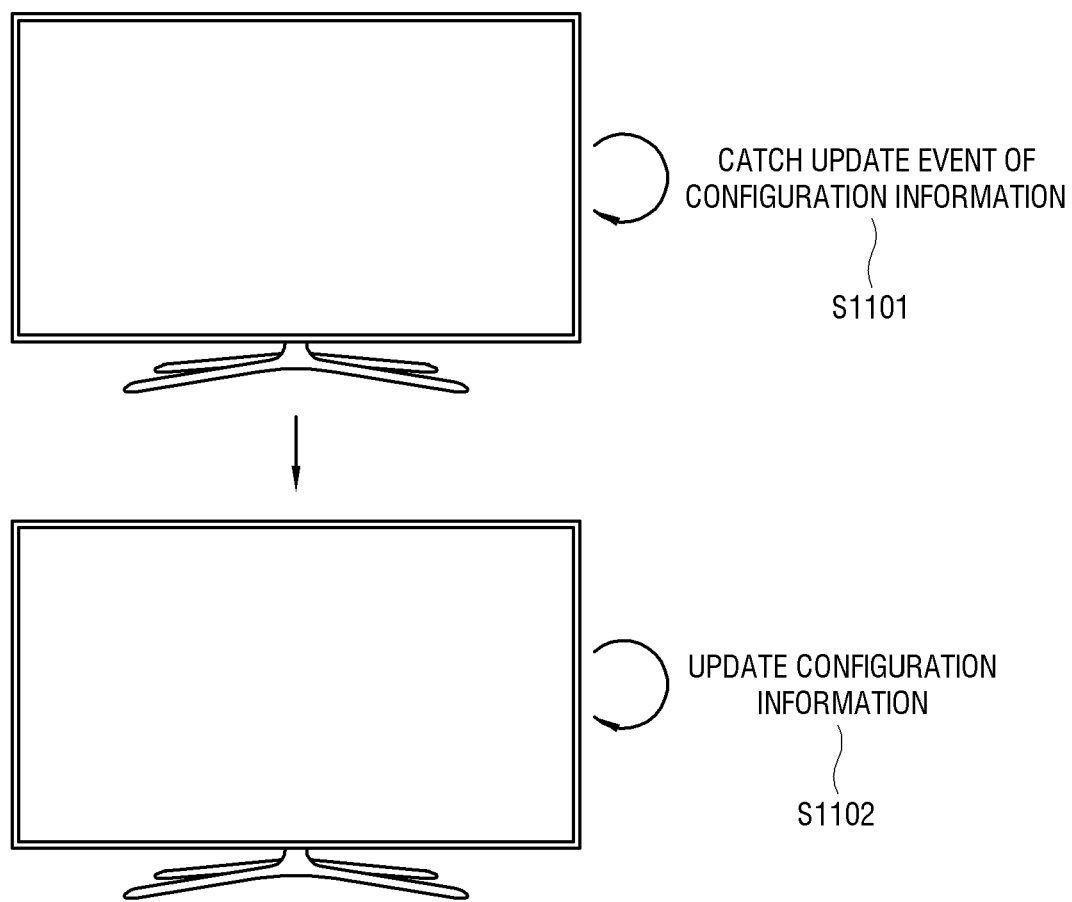
FIGS. 11, 12, 13, 14, 15, 16, 17, 18, 19, 20, 21, 22, and 23 are diagrams illustrating each example of the update of the configuration information according to the embodiment of the disclosure.

FIG. 11 illustrates an example of a process of updating the configuration information.

Compared to outputting the information on the update of the program so that the user can know the information on the update of the program as illustrated in FIG. 10 above during the update of the program, the update of the configuration information may be performed without outputting the information on the update of the configuration information during the update of the configuration information. That is, the processor 102 of the electronic apparatus 100 according to an embodiment of the disclosure catches the update event of the configuration information at the time of the update of the configuration information (S1101), and updates the configuration information accordingly (S1102). In other words, unlike the update of the program, the information on the update is not output to the user in the case of the update of the program. As a result, the update of the configuration information may be performed without the user knowing whether the update of the configuration information is being performed. One of the reasons why the user is not notified in the case of the update of the configuration information as above is that compared to the update of the program, the update of the configuration information can be completed within a short time because the capacity of the configuration information itself is small, and therefore, the need to notify the user of the update and call the user's attention may be low.

As a result, the user convenience may increase because the update of the configuration information may be performed without interrupting or interfering with the use of the electronic apparatus by the user.

There is no particular limitation on the point in time when the processor 102 of the electronic apparatus 100 according to the embodiment of the disclosure updates the program or the configuration information. The reason why the point in time when the configuration information is updated is not particularly limited is that it usually takes less time to update the configuration information compared to the update of the program. When the update information is received from the server 200, there is no particular limitation on the point in time when the update information is downloaded from the server 200.

However, when an error occurs while the program or the configuration information is updated, a case may occur in which the electronic apparatus 100 may not operate properly. Accordingly, it may be necessary to perform the update in the state or point in time in which the stability can be ensured as much as possible. Here, the secure of the stability may mean a state in which the possibility of fluctuations in the configuration information itself is low or mean a state in which there is no program that operates while referring to the configuration information, for example, in the case of updating the configuration information.

As the first embodiment for performing the update in the state in which the stability can be secured to a certain degree, the processor 102 may update the configuration information in response to the power off of the apparatus. For reference, the present embodiment and all the following embodiments are equally applicable to the update of program in addition to the update of the configuration information, but will be described based on the update of the configuration information, for convenience of description.

Figure 12:
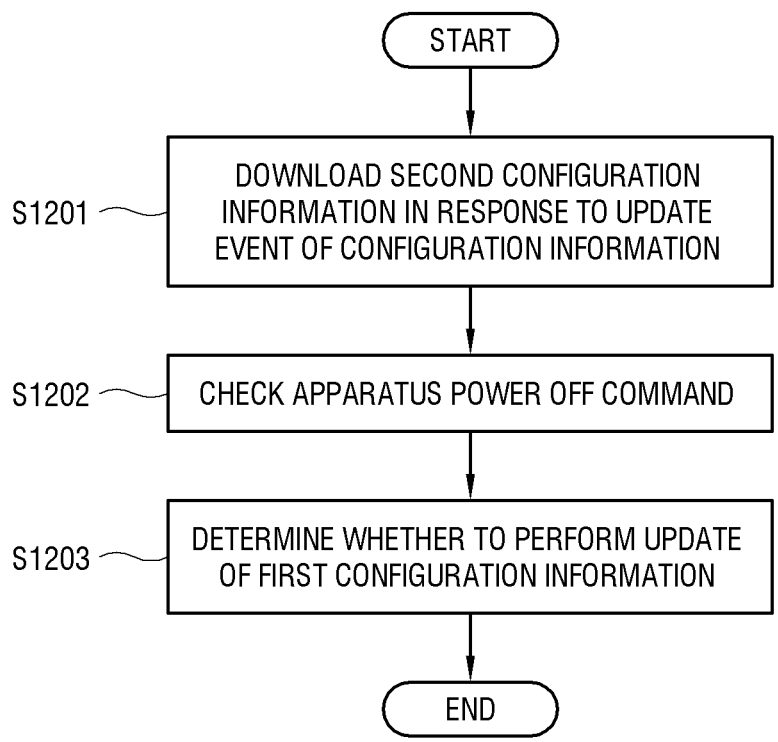

The first embodiment will be described with reference to FIGS. 12 and 13. The processor 102 of the electronic apparatus 100 according to the present embodiment downloads the second configuration information in response to the update event of the configuration information (S1201). Thereafter, after checking an apparatus power off command for the electronic apparatus 100 during the execution of the program (S1202), the processor 102 determines whether to update the first configuration information (S1203), and updates the first configuration information to the downloaded second configuration information when it is determined that the update needs to be performed. Here, the apparatus power off command may be input by the user, or the processor 102 itself may issue a power off command during the operation of the electronic apparatus 100.

However, the point in time when the second configuration information is downloaded is not limited to the point in time before the apparatus power off command is checked as described above. As another example, the processor 102 may download the second configuration information as a starting operation for substantially updating the configuration information after checking the apparatus power off command, and then update the first configuration information to the second configuration information. However, the present embodiment and all the following embodiments will be described under the assumption that the second configuration information is downloaded in advance before the update of the configuration information is actually performed, for convenience of description.

Figure 13:
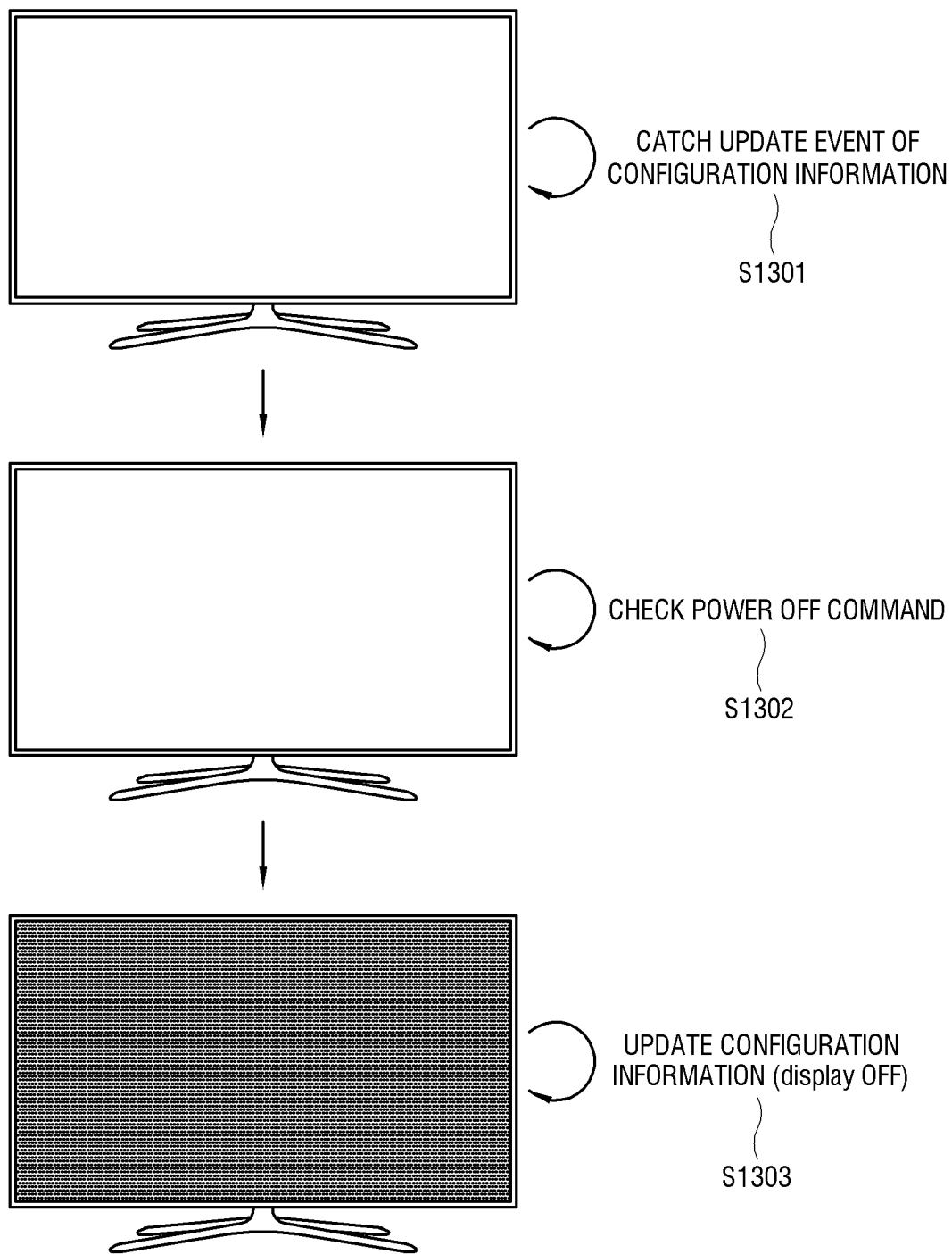

Referring to FIG. 13, describing, from the user's point of view, an operation of the electronic apparatus 100 according to the present embodiment, particularly, when the electronic apparatus 100 is implemented as a display apparatus, the processor 102 of the display apparatus 100 catches the update event of the configuration information while the user uses the display apparatus 100 (S1301). Thereafter, the processor 102 checks the power off command for the apparatus (S1302). For example, when the user of the display apparatus 100 inputs a power off command to the apparatus through a remote control, the processor 102 checks the input of the command, and then determines whether to perform the update of the configuration information and performs the update of the configuration information (S1303). Meanwhile, when a user's power off command for the display apparatus 100 is input, the image display on the display 103 is stopped accordingly. That is, the update of the configuration information for the display apparatus 100 is performed while the display 103 is turned off. As a result, the user thinks that the display apparatus 100 operates in the same way as a general situation in which the power off command is input, but the apparatus itself performs the update of the configuration information.

As a result, the update can be performed while the users are given the impression that the apparatus is being used as usual, and therefore, the use convenience increases. In addition, since the update is performed after the user indicates the intention that he or she does not use the apparatus, the possibility of occurrence in an error due to the use of the apparatus by the user decreases.

Figure 14:
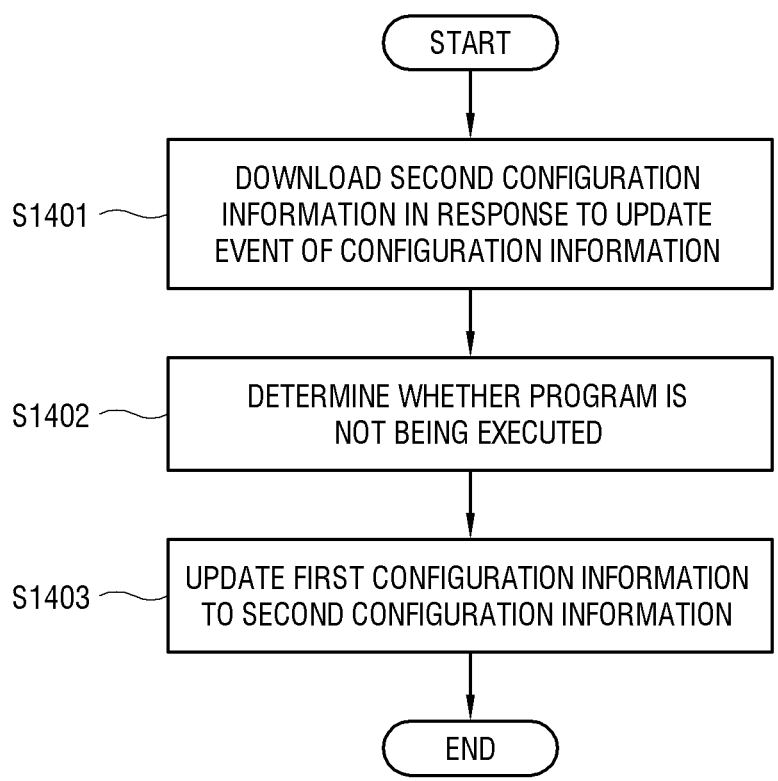

A second embodiment of the point in time when the processor 102 of the electronic apparatus 100 according to the disclosure updates the configuration information will be described with reference to FIG. 14.

The processor 102 of the electronic apparatus 100 according to the second embodiment of the disclosure updates the first configuration information based on the determination that the program is not being executed. Specifically, the processor 102 of the electronic apparatus 100 downloads the second configuration information in response to the update event of the configuration information (S1401). Then, it is determined whether a program is not being executed in the electronic apparatus 100 (S1402). If it is determined that the program is not being executed, the processor 102 updates the first configuration information to the downloaded second configuration information (S1403).

Here, the program used when determining whether the program is not being executed means a program including an execution code that performs an operation based on the first configuration information. When a program including an execution code that performs an operation based on the first configuration information is not being executed, as in the first embodiment described above, even if the first configuration information is updated to the second configuration information immediately at this point in time without needing to wait for a power off command for the apparatus, the update may be successfully performed without affecting the operation of the electronic apparatus 100 or the operation of other programs.

As a result, since the configuration information may be immediately updated during the operation of the electronic apparatus, the update of the configuration information may be performed more quickly and immediately.

Figure 15:
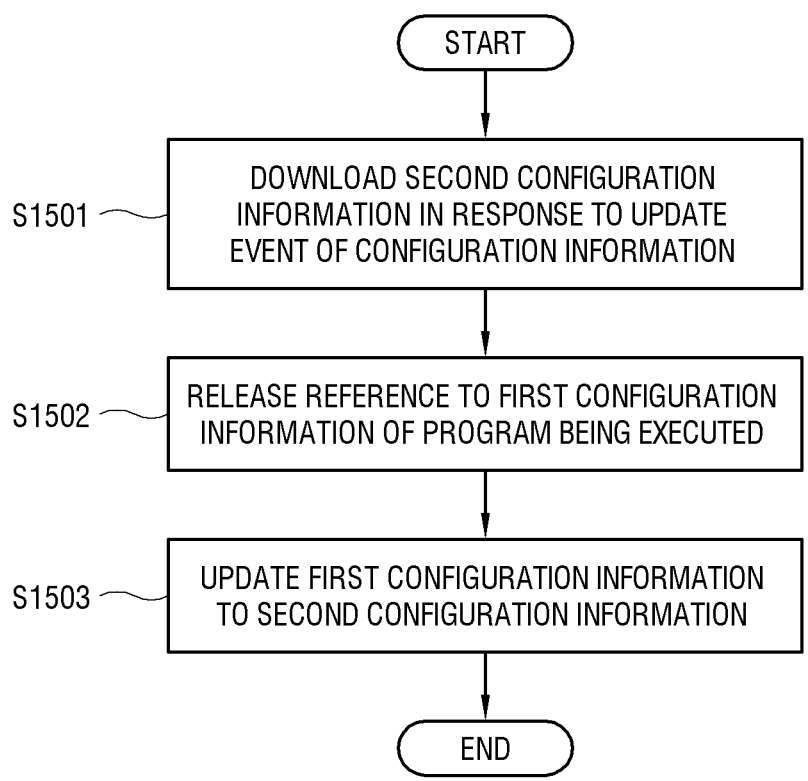

A third embodiment of the point in time when the processor 102 of the electronic apparatus 100 according to the disclosure updates the configuration information will be described with reference to FIGS. 15 and 16.

When the program is being executed, the processor 102 of the electronic apparatus 100 according to the third embodiment of the disclosure releases the reference to the first configuration information of the program being executed and then updates the first configuration information.

Specifically, the processor 102 of the electronic apparatus 100 downloads the second configuration information in response to the update event of the configuration information (S1501). Thereafter, the reference to the first configuration information of the program being executed in the electronic apparatus 100 is released (S1502). When the reference to the first configuration information is released, the processor 102 updates the first configuration information to the downloaded second configuration information (S1503).

The program here also refers to a program including an execution code that performs an operation based on the first configuration information, as in the second embodiment. In other words, in the case of the third embodiment, unlike the second embodiment, the program operating based on the first configuration information is executing, and therefore, if the first configuration information is immediately updated to the second configuration information in the current state, since the program being executed may be affected, the reference to the first configuration information of the above program is released, and then the first configuration information is updated to the second configuration information.

This will be described in more detail with reference to FIG. 16. FIG. 16 illustrates a memory 1600 into which an executed program is loaded.

Figure 16:
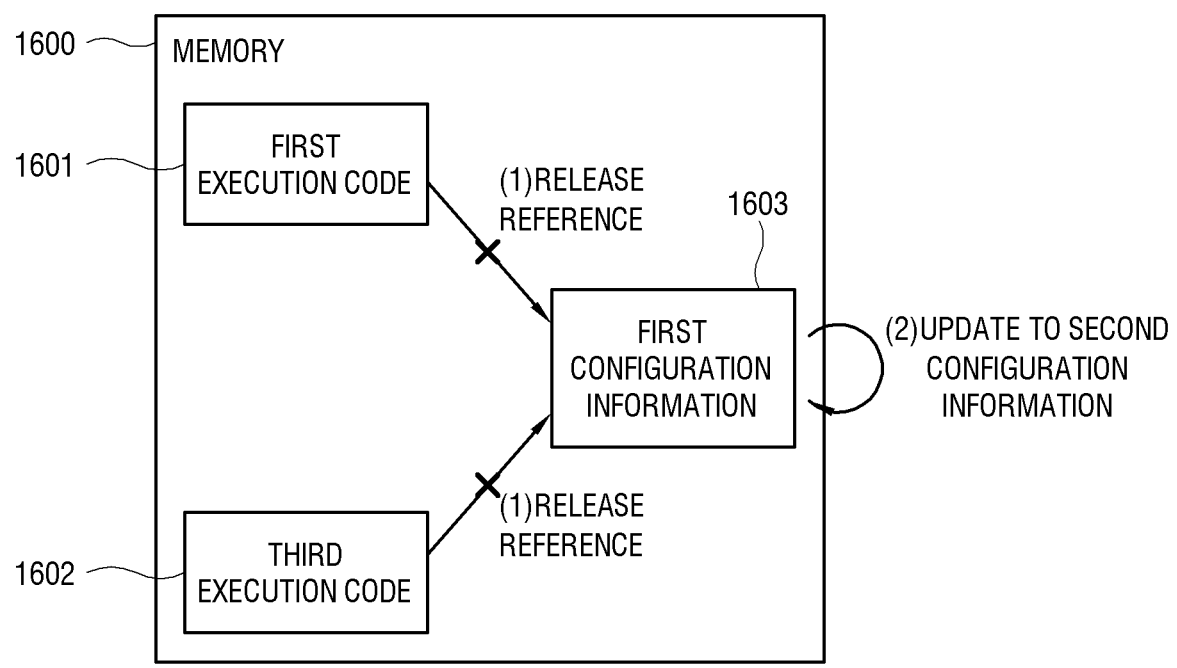

As illustrated in FIG. 16, a first program and a third program are being executed, and if first configuration information 1603 is updated to second configuration information without taking separate actions while a first execution code 1601 of the first program and a third execution code 1602 of the third program are each executing by referring to the first configuration information 1603, there is a possibility that the operation of the executing first program or third program may be affected. Alternatively, even if the first configuration information 1603 is updated to the second configuration information while the first program or the third program is being executed, the information on each program loaded into the memory 1600 is erased from the memory as the execution of the first program or the third program is terminated. On the other hand, the configuration information already changed from the first configuration information to the second configuration information may again overwrite the first configuration information loaded into the memory in the process of being stored in the storage 101 at that time.

Therefore, in order to prevent the occurrence of such an error operation or an unintended result, the processor 102 of the present embodiment releases the reference to the first configuration information of the program being executed in the electronic apparatus 100, and then updates the first configuration information to the second configuration information.

As a result, the configuration information may be updated even when the program is being executed on the electronic apparatus.

Figure 17:
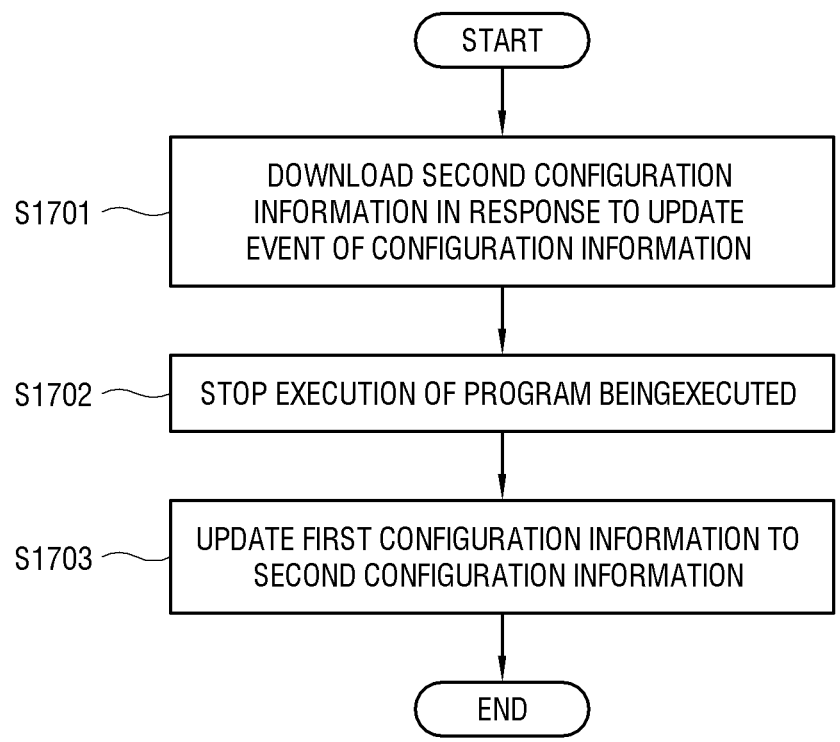

A fourth embodiment of the point in time when the processor 102 of the electronic apparatus 100 according to the disclosure updates the configuration information will be described with reference to FIG. 17.

The processor 102 of the electronic apparatus 100 according to the fourth embodiment of the disclosure updates the first configuration information after the program is stopped when the program is being executed.

Specifically, the processor 102 of the electronic apparatus 100 downloads the second configuration information in response to the update event of the configuration information (S1701). Then, the execution of the program being executed in the electronic apparatus 100 is stopped (S1702). If it is determined that the execution of the program being executed is stopped, the processor 102 updates the first configuration information to the downloaded second configuration information (S1703).

That is, unlike the third embodiment in which the reference to the first configuration information is released for the program being executed by referring to the first configuration information, according to the fourth embodiment, the execution of the program being executed itself is stopped by the first configuration information, and as a result, the reference to the first configuration information is released.

As a result, the configuration information may be updated even when the program is being executed on the electronic apparatus.

Figure 18:
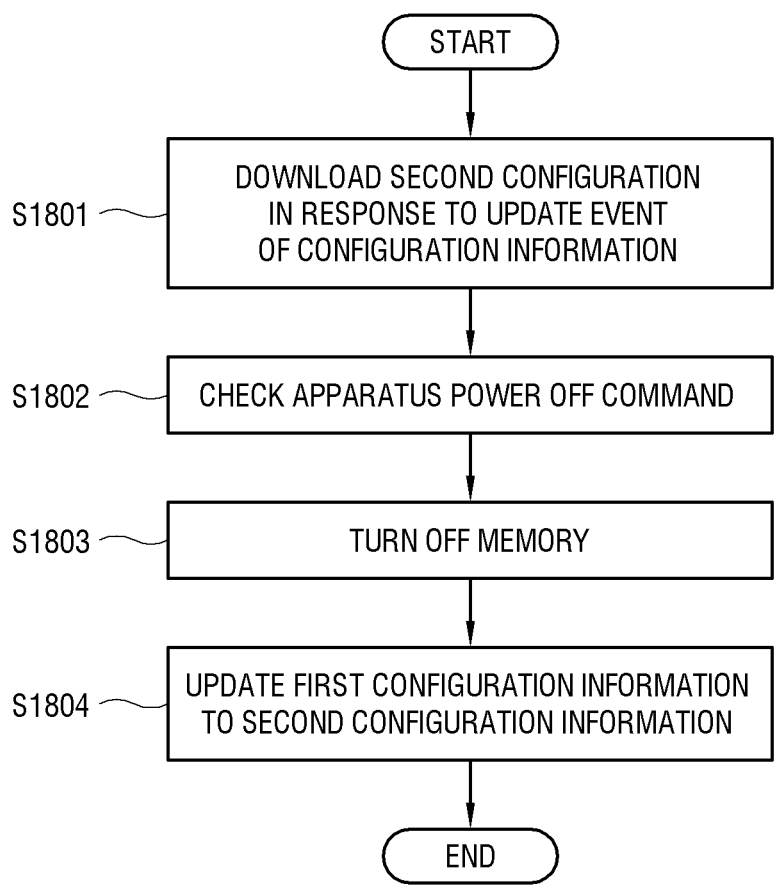

A fifth embodiment of the point in time when the processor 102 of the electronic apparatus 100 according to the disclosure updates the configuration information will be described with reference to FIG. 18.

The electronic apparatus 100 according to the fifth embodiment of the disclosure further includes a memory into which data to be accessed by the processor 102 is loaded, and when it is determined that the update of the first configuration information needs to be performed, the processor 102 of the electronic apparatus 100 receives the second configuration information from the server, stores the received second configuration information in the storage, and then turns off the memory in response to the power off of the apparatus, and updates the first configuration information using the second configuration information stored in the storage.

Specifically, the processor 102 of the electronic apparatus 100 downloads the second configuration information in response to the update event of the configuration information (S1801). However, the fact that the point in time when the second configuration information is downloaded is not limited thereto is as described above. Thereafter, the processor 102 checks the power off command for the apparatus (S1802), turns off the memory (S1803), and updates the first configuration information to the downloaded second configuration information (S1804).

That is, according to the fifth embodiment, the processor 102 of the electronic apparatus 100 checks the power off command for the apparatus to check that the user does not use the apparatus, and then unlike only releasing the reference to the configuration information or stopping only the program being executed in the third or fourth embodiments above prior to updating the configuration information, turns off the memory itself into which the currently executing program and various types of data are loaded.

As a result, the stability at the time of the update of the configuration information is improved.

Figure 19:
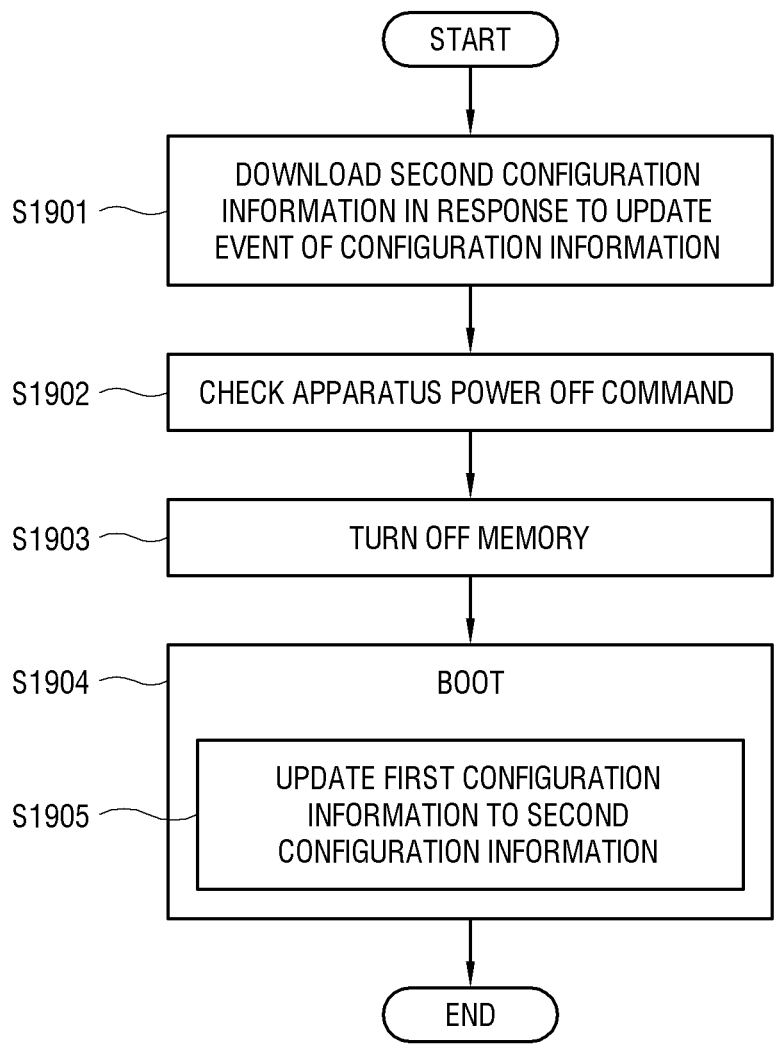

A sixth embodiment of the disclosure will be described with reference to FIG. 19. The sixth embodiment which goes further from the above fifth embodiment starts booting of the apparatus after turning off the memory, and updates the first configuration information during the booting.

Specifically, the electronic apparatus 100 further includes the display 103, and the processor 102 of the electronic apparatus 100 downloads the second configuration information in response to the update event of the configuration information (S1901). Thereafter, the processor 102 checks the power off command for the apparatus (S1902), turns off the memory (S1903), and starts booting of the electronic apparatus 100 while the display 103 is turned off (S1904), and updates the first configuration information to the downloaded second configuration information using the second configuration information stored in the storage 101 during the booting (S1905).

As a result, the apparatus is initialized after the memory is turned off and the configuration information is updated while the booting is in progress, so the stability at the time of the update of the configuration information may be secured more reliably.

Figure 20:
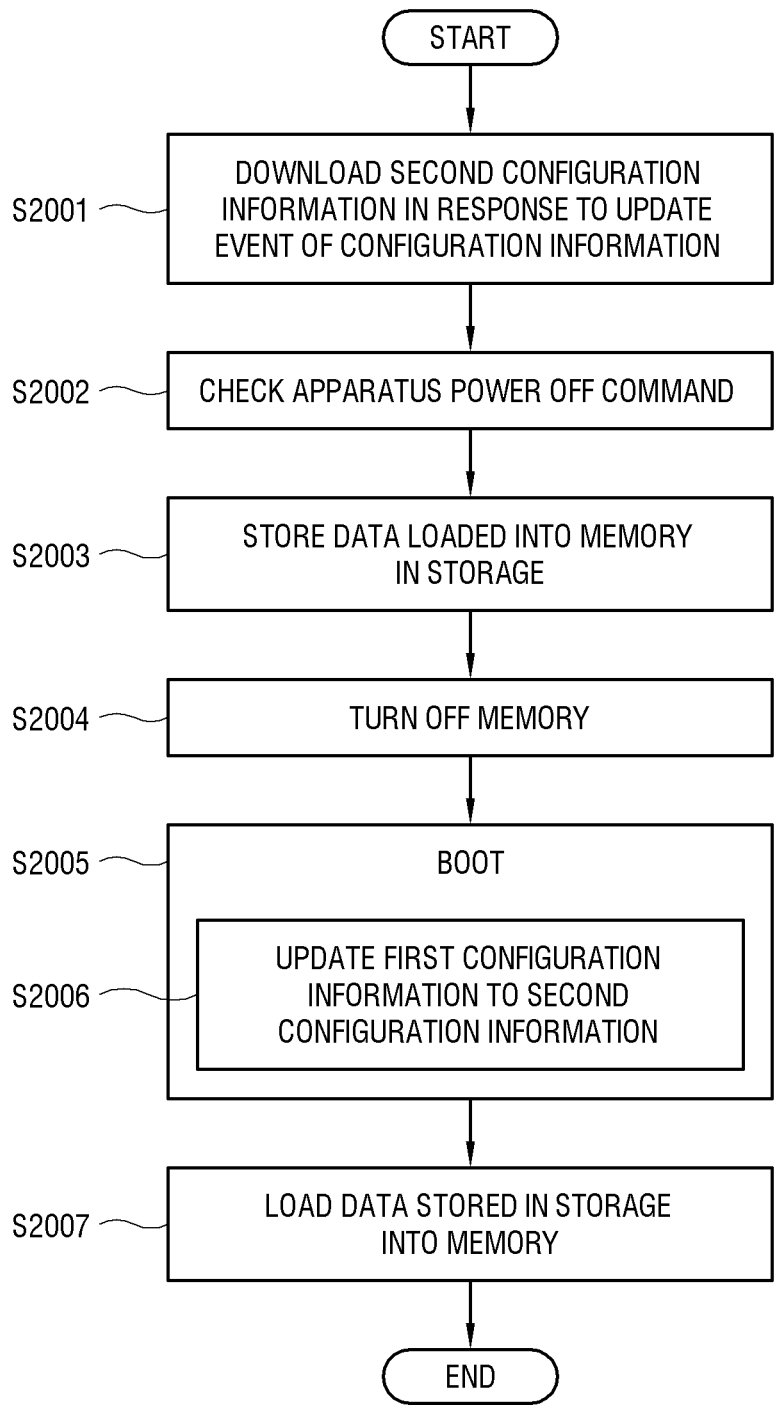
Figure 21:
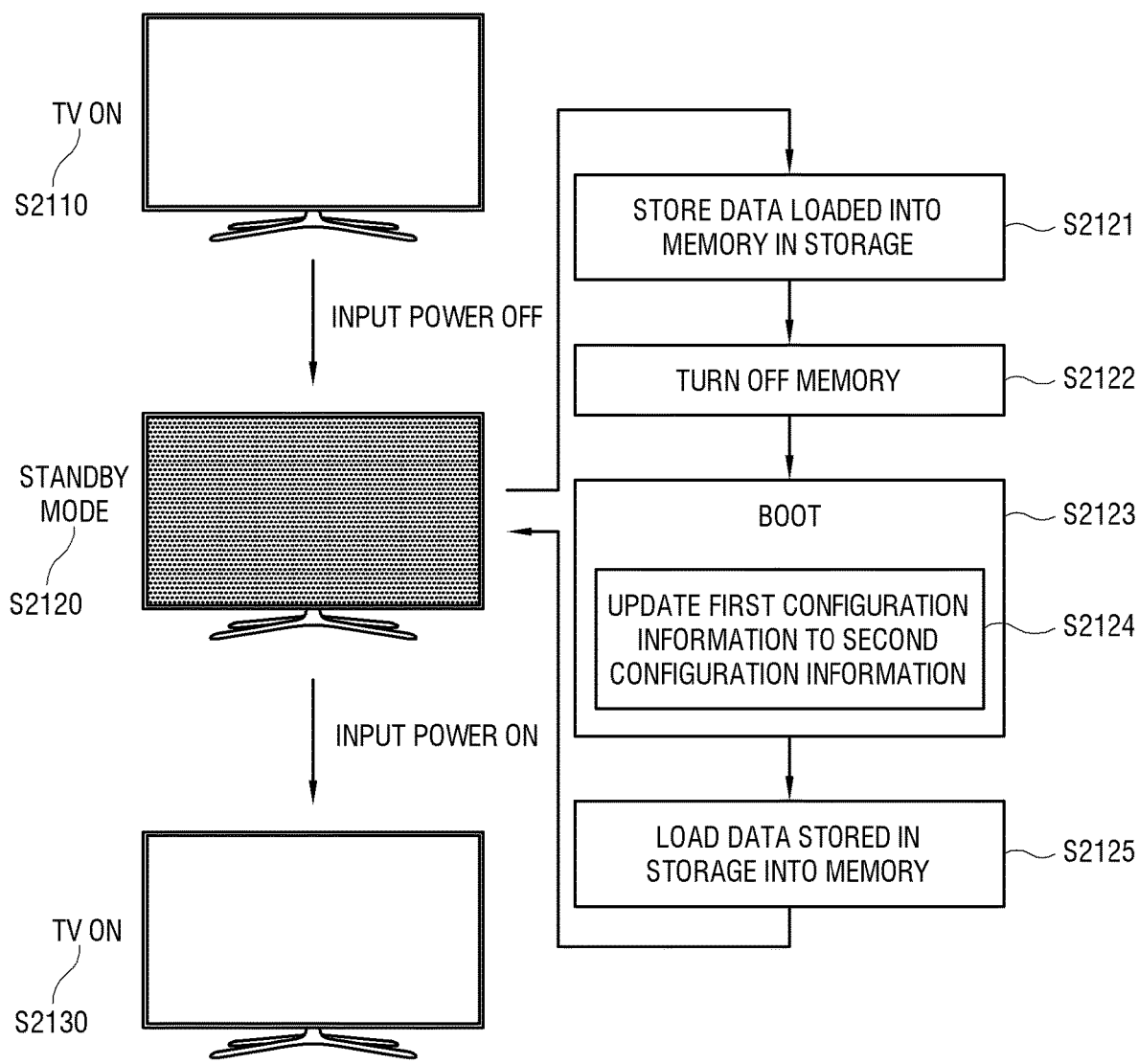

A seventh embodiment of the disclosure will be described with reference to FIGS. 20 and 21. The seventh embodiment which goes further from the sixth embodiment above is an embodiment in which the state is the same as the state just before the update is made except that the configuration information has been changed, even after the configuration information is updated. For example, as described with reference to FIG. 7 above, in the case of some smart TVs, when the user inputs the power off, in order to make the TVs operational faster at the next power on input, the TVs may be designed to enter the standby mode in which the supply of power to some components (for example, memory) is maintained, not stopping the operation of all the components of the TV. In the seventh embodiment, the smart TVs are in the same state as the standby mode just before the update is performed, except that the configuration information has been changed even when the update of configuration information is performed after entering the standby mode as described above and the cold reset is performed in the process.

Specifically, the processor 102 of the electronic apparatus 100 downloads the second configuration information in response to the update event of the configuration information (S2001). Thereafter, the processor 102 checks the power off command for the apparatus (S2002), and stores the data loaded into the memory in the storage 101 (S2003) when it is determined that it is necessary to perform the update of the first configuration information in response to the power off prior to turning off the memory (S2004). The processor 102 starts booting of the electronic apparatus 100 (S2005), updates the first configuration information to the downloaded second configuration information during the booting (S2006), and then loads the data previously stored in the storage 101 into the memory (S2007). When it is determined that it is not necessary to update the first configuration information in response to the power off, the processor and the display 103 may be turned off while power is continuously applied to the memory.

As a result, as the electronic apparatus operates in the same state as before the update except that the configuration information is updated even after updating the configuration information, since the state at the time of power off may be maintained even after the update, the user may use the electronic apparatus with the updated configuration information without experiencing any changes in the user experience.

The above effect will be described in detail with reference to FIG. 21. FIG. 21 is a diagram illustrating an operation of a TV designed to basically enter a standby mode for a faster response when a user inputs power on in the case where the electronic apparatus 100 is a TV and the user inputs power off.

In this case, in the state in which the power of the TV is turned on (S2110), when a power off command from the user is input, the TV enters the standby mode (S2120). Thereafter, when the power on command from the user is input, the TV is turned on again and becomes operational (S2130). Compared to the case when the power is turned on again after the supply of power to all components of the TV is cut off without entering the standby mode at the previous power off, in the case of FIG. 21 in which the power supply is turned on again after the TV enters the standby mode, the TV becomes operational faster.

At this time, when the update of the configuration information is required, according to the seventh embodiment, even after the update of the configuration information, the state is in the same state as the standby mode before the update except that the configuration information is updated.

Specifically, until the TV enters the standby mode by inputting a power off command from the user (S2120) and then the TV becomes operational by the power on command from the user (S2130), the user does not recognize the TV because the display 103 of the TV is turned off, but in the meantime, the processor 102 of the TV performs an operation of storing the data loaded into the memory in the storage 101 (S2121), turning off the memory (S2122), starting booting of the apparatus (S2123), updating the first configuration information to the second configuration information during the booting (S2124), and loading the data previously stored in the storage 101 into the memory. That is, after the update of the configuration information is performed without the user knowing, the TV returns to the same standby mode as before.

As a result, the user uses the electronic apparatus with the updated configuration information without the user experiencing any changes in the user experience.

Figure 22:
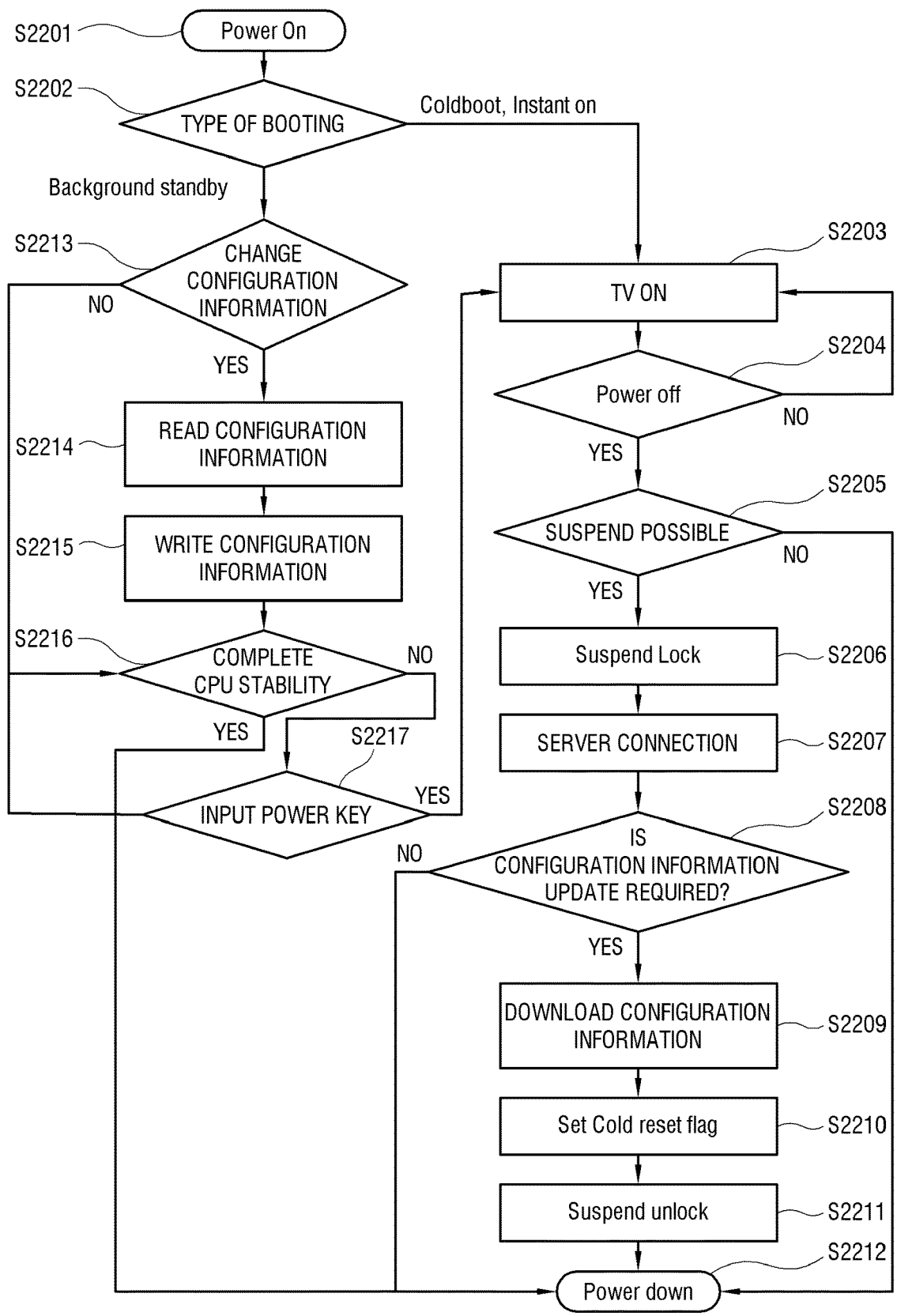

Referring to FIG. 22, when the above seventh embodiment is applied to the TV, the operation of the TV will be described in more detail. In this example, the TV operates in three booting modes: instant on, coldboot, and background standby. The instant on refers to the booting mode in which the TV wakes up from the standby mode and enters the operational state, the coldboot refers to the booting mode in which the TV enters the operational state after the cold reset, and the background standby refers to the booting mode of performing the operation or the like for error recovery when an error occurs.

In the flowchart of FIG. 22, operations are branched according to the above booting mode. Specifically, when a command instructing the TV to be powered on, such as inputting a user command, is checked (S2201), the processor 102 checks the type of booting mode (S2202). When the booting mode is checked as the coldboot or the instant on, the TV is turned on (S2203) and performs normal operation. In the meantime, when a command instructing the TV to be powered off is checked (S2204), the processor 102 checks whether the state is possible to enter suspend (S2205). Here, the state in which the TV can enter the suspend means a state in which errors such as system crash and process dead-lock do not occur. When it is checked that the TV can enter the suspend, the processor 102 locks the TV (S2206) so that the TV is not disturbed by other operations. Thereafter, the processor 102 accesses the server 200 (S2207) to check whether the configuration information needs to be updated (S2208), and downloads the configuration information if it is determined that the configuration information needs to be updated (S2209). Then, a cold reset flag is configured (S2210). When the cold reset flag is configured, when the type of booting mode is checked (S2202), the TV enters a background standby mode. Thereafter, the processor 102 unlocks the TV (S2211) and then turns off the power of the TV (S2212).

When checking the type of booting mode (S2202), if the booting mode is checked as the background standby due to reasons such as the configuration of the cold reset flag, the processor 102 determines whether it is necessary to change the configuration information (S2213), and reads the downloaded configuration information in the previous step S2209 (S2214) if it is determined that it is necessary to change the configuration information and then writes the downloaded configuration information into the existing configuration information (S2215), thereby updating the configuration information.

That is, the TV according to FIG. 22 does not check and initialize the update of the configuration information when the booting mode is the coldboot or the instant on, and then when the power off command is received, the TV downloads the configuration information according to whether the update of the configuration information is required at that time and then is configured to be booted in the background standby booting mode. On the other hand, in the case of background standby booting mode, it is checked whether the update of the configuration information needs to be performed, the update of the configuration information is performed, and the apparatus is initialized.

As a result, the update of the configuration information may be performed according to a smooth operation flow no matter what operating state the TV is in.

Figure 23:
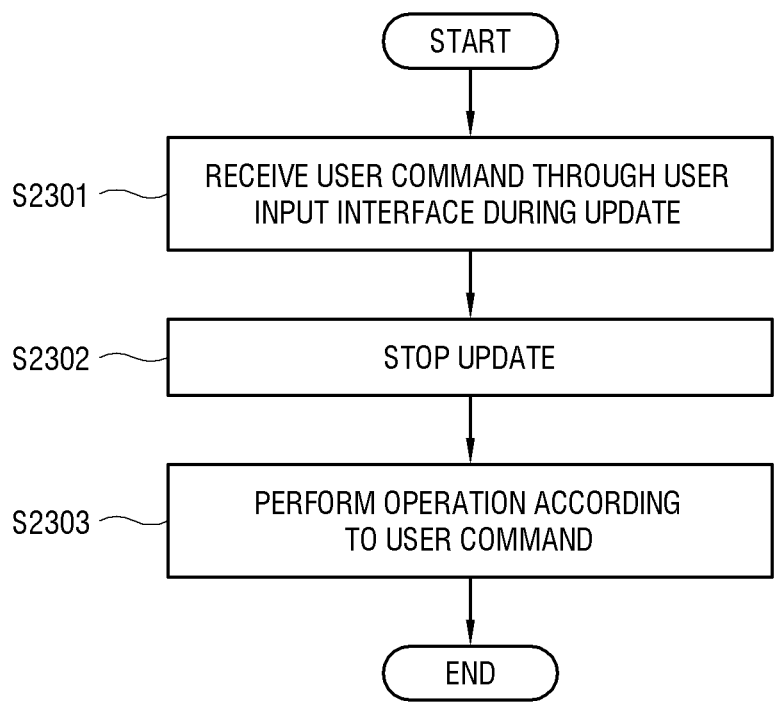

FIG. 23 illustrates an operation of an electronic apparatus 100 according to another embodiment of the disclosure.

The processor 102 of the electronic apparatus 100 according to another embodiment of the disclosure stops the update (S2302) when the user command is input through the user input interface while updating the first configuration information to the second configuration information (S2301), and performs the operation according to the user command (S2303).

As described above with reference to FIG. 11, the processor 102 of the electronic apparatus 100 according to the embodiment of the disclosure may perform the update of the configuration information without outputting the information on the update of the configuration information to the user. In this case, since the user does not recognize that the configuration information is being updated, there may be the case where the user command is input through the user input interface. In that case, the processor 102 of the electronic apparatus 100 according to the present embodiment may stop updating and perform the operation according to the user command That is, the display of the electronic apparatus is powered on, and the first execution code is executed based on the first configuration information. As a result, it is possible to make sure that the user is not disturbed to use the apparatus by the update of the configuration information operation.

On the other hand, according to the disclosure, the execution code and the configuration information are separated from the program, and when both the execution code and the configuration information need not to be updated but only the configuration information needs to be updated, since the execution code may be maintained and only the configuration information may be updated, the execution code and the configuration information may be designed to be separately stored in different storages 101 or storage locations from the time when the program for driving the electronic apparatus is installed in the storage 101 of the electronic apparatus 100. For example, if the configuration information is expected to be updated frequently but the execution code is expected not to be updated frequently, the configuration information should be installed in the storage that can be read and written freely, while the execution code may be installed in the storage and the like in which the execution code cannot be written, can be written only a limited number of times, or can be written only by a separate method, and the like.

According to the disclosure, the execution code and the configuration information may be separated from the program, and when both the execution code and the configuration information need not to be updated and only the configuration information needs to be updated, the execution code is maintained and only the configuration information is updated, thereby more quickly and efficiently performing the update of the program depending on the situations.

According to the disclosure, the user convenience may increase because the update of the configuration information may be performed without interrupting or interfering with the use of the electronic apparatus by the user.

According to the disclosure, the update can be performed while the users are given the impression that the apparatus is being used as usual, and therefore, the use convenience increases. In addition, since the update is performed after the user indicates the intention that he or she does not use the apparatus, the possibility of occurrence in an error due to the use of the apparatus by the user decreases.

According to the disclosure, since the configuration information may be immediately updated during the operation of the electronic apparatus, the update of the configuration information may be performed more quickly and immediately.

According to the disclosure, the configuration information may be updated even when the program is being executed on the electronic apparatus.

According to the disclosure, the stability at the time of the update of the configuration information is improved.

According to the disclosure, the apparatus is initialized after the memory is turned off and the configuration information is updated while the booting is in progress, so the stability at the time of the update of the configuration information may be secured more reliably.

According to the disclosure, as the electronic apparatus operates in the same state as before the update except that the configuration information is updated even after updating the configuration information, since the state at the time of power off may be maintained even after the update, the user may use the electronic apparatus with the updated configuration information without experiencing any changes in the user experience.

According to the disclosure, the execution code and the configuration information may be separated from the program, and when both the execution code and the configuration information need not to be updated and only the configuration information needs to be updated, the execution code is maintained and only the configuration information is updated, thereby more quickly and efficiently performing the update of the program depending on the situations.

According to the disclosure, the user convenience may increase because the update of the configuration information may be performed without interrupting or interfering with the use of the electronic apparatus by the user.

According to the disclosure, the update can be performed while the users are given the impression that the apparatus is being used as usual, and therefore, the use convenience increases. In addition, since the update is performed after the user indicates the intention that he or she does not use the apparatus, the possibility of occurrence in an error due to the use of the apparatus by the user decreases.

According to the disclosure, since the configuration information may be immediately updated during the operation of the electronic apparatus, the update of the configuration information may be performed more quickly and immediately.

According to the disclosure, the configuration information may be updated even when the program is being executed on the electronic apparatus.

According to the disclosure, the stability at the time of the update of the configuration information is improved.

According to the disclosure, the apparatus is initialized after the memory is turned off and the configuration information is updated while the booting is in progress, so the stability at the time of the update of the configuration information may be secured more reliably.

According to the disclosure, as the electronic apparatus operates in the same state as before the update except that the configuration information is updated even after updating the configuration information, since the state at the time of power off may be maintained even after the update, the user may use the electronic apparatus with the updated configuration information without experiencing any changes in the user experience.

What is claimed is:

1. An electronic apparatus, comprising:
   a storage;
   a communication interface communicating with a server; and
   a processor configured to:
      execute a first execution code based on first configuration information in response to an execution event of a program including the first execution code and the first configuration information stored in the storage,
      in response to an update event, identify whether the update event is an update event of the program or an update event of the first configuration information based on information received from the server,
      update the program by replacing the first execution code and the first configuration information with a second execution code and second configuration information in response to an update event of the program, and
      update the first configuration information to the second configuration information while maintaining the first execution code in response to the update event of the first configuration information,
   wherein the processor is further configured to:
      identify whether to update the first configuration information in response to power off of the electronic apparatus during the execution of the program, and
      update the first configuration information in response to the power off of the electronic apparatus.

2. The electronic apparatus of claim 1, wherein the processor is configured to output information on the update of the program to a user during the update of the program, and perform the update of the first configuration information without outputting the information on the update of the first configuration information when updating the first configuration information.

3. The electronic apparatus of claim 1, wherein the processor is configured to update the first configuration information based on the identification that the program is not being executed.

4. The electronic apparatus of claim 1, wherein the processor is configured to release a reference to the first configuration information of the program being executed, and update the first configuration information.

5. The electronic apparatus of claim 1, wherein the processor is configured to stops the execution of the program being executed and update the first configuration information.

6. The electronic apparatus of claim 1, further comprising:
   a memory into which data to be accessed by the processor is loaded, wherein the processor, based on the identification that the update of the first configuration information needs to be performed, is configured to receive the second configuration information from a server, store the received second configuration information in the storage, turn off the memory in response to the power off, and update the first configuration information using the second configuration information stored in the storage.

7. The electronic apparatus of claim 6, further comprising:
   a display,
   wherein the processor is configured to start booting with the display being turned off after turning off the memory, and update the first configuration information using the second configuration information stored in the storage during the booting.

8. The electronic apparatus of claim 6, wherein the processor is configured to store the data loaded into the memory in the storage and then turn off the memory, and load the data stored in the storage into the memory when the update of the first configuration information is completed.

9. The electronic apparatus of claim 1, wherein the processor is configured to stop the update and perform an operation according to a user command when the user command is input through a user input interface while the first configuration information is updated to the second configuration information.

10. A control method of an electronic apparatus, comprising:
   storing a program including a first execution code and first configuration information in a storage;
   executing the first execution code based on the first configuration information in response to an execution event of the program;
   in response to an update event, identifying whether the update event is an update event of the program or an update event of the first configuration information based on information received from a server;
   updating the program by replacing the first execution code and the first configuration information with a second execution code and second configuration information in response to an update event of the program;
   updating the first configuration information to second configuration information while maintaining the first execution code in response to an update event of the first configuration information;
   identifying whether to update the first configuration information in response to power off of the electronic apparatus during the execution of the program; and
   updating the first configuration information in response to the power off of the electronic apparatus.

11. The control method of claim 10, wherein the updating of the program further includes outputting information on the update of the program to a user during the update of the program, and
   in the updating of the first configuration information, the update of the first configuration information is performed without outputting the information on the update of the first configuration information.

12. The control method of claim 10, wherein in the updating of the first configuration information, the first configuration information is updated based on the identification that the program is not being executed.

13. A non-transitory machine-accessible medium storing instructions which, when executed by a processor of an electronic apparatus, cause the electronic apparatus to perform operations comprising:
   storing a program including a first execution code and first configuration information in a storage;
   executing the first execution code based on the first configuration information in response to an execution event of the program;
   in response to an update event, identifying whether the update event is an update event of the program or an update event of the first configuration information based on information received from a server;
   updating the program by replacing the first execution code and the first configuration information with a second execution code and second configuration information in response to an update event of the program;
   updating the first configuration information to second configuration information while maintaining the first execution code in response to an update event of the first configuration information;
   identifying whether to update the first configuration information in response to power off of the electronic apparatus during the execution of the program; and
   updating the first configuration information in response to the power off of the electronic apparatus.

* * * * *